(12) United States Patent
Abbasi et al.

(10) Patent No.: US 12,533,805 B2
(45) Date of Patent: Jan. 27, 2026

(54) ROBOTIC SURGICAL SYSTEM WITH CUT SELECTION LOGIC

(71) Applicant: MAKO Surgical Corp., Weston, FL (US)

(72) Inventors: Abdullah Abbasi, San Diego, CA (US); Daniel Perez, Miami, FL (US); Jason Otto, Plantation, FL (US)

(73) Assignee: MAKO Surgical Corp., Weston, FL (US)

( * ) Notice: Subject to any disclaimer, the term of this patent is extended or adjusted under 35 U.S.C. 154(b) by 893 days.

(21) Appl. No.: 17/513,436

(22) Filed: Oct. 28, 2021

(65) Prior Publication Data

US 2022/0133331 A1     May 5, 2022

Related U.S. Application Data

(60) Provisional application No. 63/189,508, filed on May 17, 2021, provisional application No. 63/131,654, (Continued)

(51) Int. Cl.
*A61B 34/30* (2016.01)
*A61B 17/14* (2006.01)
(Continued)

(52) U.S. Cl.
CPC ........... *B25J 9/1664* (2013.01); *A61B 17/142* (2016.11); *A61B 34/20* (2016.02); *A61B 34/25* (2016.02);
(Continued)

(58) Field of Classification Search
CPC ......... A61B 34/20; A61B 34/25; A61B 34/30; A61B 17/142; A61B 2034/2059; A61B 2034/252
See application file for complete search history.

(56) References Cited

U.S. PATENT DOCUMENTS

| 4,559,936 A | 12/1985 | Hill |
| 5,078,140 A | 1/1992 | Kwoh |

(Continued)

FOREIGN PATENT DOCUMENTS

| EP | 1 518 501 A2 | 3/2005 |
| EP | 1 690 503 A1 | 8/2006 |

(Continued)

OTHER PUBLICATIONS

International Search Report and Written Opinion for International Application No. PCT/US2021/057024, mailed Feb. 16, 2022, 17 pages.

(Continued)

*Primary Examiner* — Tracy L Kamikawa
(74) *Attorney, Agent, or Firm* — FOLEY & LARDNER LLP

(57) ABSTRACT

A method of controlling a surgical system includes obtaining a surgical plan containing a plurality of planned cuts, receiving a first cutting tool from a plurality of cutting tools at a surgical device, collecting a first checkpoint by tracking a probe as the probe contacts a first predefined point on the first cutting tool, collecting a second checkpoint by tracking the probe as the probe contacts a second predefined point at a first bone of a patient, automatically selecting a first planned cut from the plurality of planned cuts based on the first checkpoint and the second checkpoint, and, in response to automatically selecting the first planned cut, guiding execution of the first planned cut using the first cutting tool.

18 Claims, 11 Drawing Sheets

Related U.S. Application Data filed on Dec. 29, 2020, provisional application No. 63/125,481, filed on Dec. 15, 2020, provisional application No. 63/107,781, filed on Oct. 30, 2020.

(51) Int. Cl.
*A61B 34/00* (2016.01)
*A61B 34/20* (2016.01)
*A61B 34/32* (2016.01)
*B25J 9/16* (2006.01)
*G05B 15/02* (2006.01)
*G16H 20/40* (2018.01)
*G16H 40/67* (2018.01)

(52) U.S. Cl.
CPC .............. *A61B 34/30* (2016.02); *A61B 34/32* (2016.02); *B25J 9/1689* (2013.01); *B25J 9/1692* (2013.01); *G05B 15/02* (2013.01); *G16H 20/40* (2018.01); *G16H 40/67* (2018.01); *A61B 2034/2055* (2016.02); *A61B 2034/2059* (2016.02); *A61B 2034/252* (2016.02)

(56) References Cited

U.S. PATENT DOCUMENTS

| | | | |
|---|---|---|---|
| 5,413,573 | A | 5/1995 | Koivukangas |
| 5,540,696 | A | 7/1996 | Booth et al. |
| 5,630,431 | A | 5/1997 | Taylor |
| 5,682,886 | A | 11/1997 | Delp et al. |
| 5,800,438 | A | 9/1998 | Tuke et al. |
| 5,824,085 | A | 10/1998 | Sahay et al. |
| 6,328,752 | B1 | 12/2001 | Sjostrom et al. |
| 6,595,997 | B2 | 7/2003 | Axelson et al. |
| 6,685,711 | B2 | 2/2004 | Axelson et al. |
| 6,758,850 | B2 | 7/2004 | Smith et al. |
| 6,827,723 | B2 | 12/2004 | Carson |
| 6,859,661 | B2 | 2/2005 | Tuke |
| 7,008,362 | B2 | 3/2006 | Fitzgibbon |
| 7,412,897 | B2 | 8/2008 | Crottet et al. |
| 7,510,557 | B1 | 3/2009 | Bonutti |
| 7,547,307 | B2 | 6/2009 | Carson et al. |
| 7,591,821 | B2 | 9/2009 | Kelman |
| 7,607,440 | B2 | 10/2009 | Coste-Maniere et al. |
| 7,618,421 | B2 | 11/2009 | Axelson et al. |
| 7,634,306 | B2 | 12/2009 | Sarin et al. |
| 7,670,345 | B2 | 3/2010 | Plassky et al. |
| 7,696,899 | B2 | 4/2010 | Immerz et al. |
| 7,794,467 | B2 | 9/2010 | McGinley et al. |
| 7,809,421 | B1 | 10/2010 | Govari |
| 7,831,295 | B2 | 11/2010 | Friedrich et al. |
| 7,927,336 | B2 | 4/2011 | Rasmussen |
| 7,931,655 | B2 | 4/2011 | Axelson et al. |
| 7,945,310 | B2 | 5/2011 | Gattani et al. |
| 7,963,913 | B2 | 6/2011 | Devengenzo et al. |
| 8,007,448 | B2 | 8/2011 | Moctezuma De La Barrera |
| 8,010,180 | B2 | 8/2011 | Quaid et al. |
| 8,038,683 | B2 | 10/2011 | Couture et al. |
| 8,075,317 | B2 | 12/2011 | Youngblood |
| 8,078,440 | B2 | 12/2011 | Otto et al. |
| 8,096,997 | B2 | 1/2012 | Plaskos et al. |
| 8,109,942 | B2 | 2/2012 | Carson |
| 8,116,847 | B2 | 2/2012 | Gattani et al. |
| 8,120,301 | B2 * | 2/2012 | Goldberg .............. G16H 40/67 318/432 |
| 8,126,533 | B2 | 2/2012 | Lavallee |
| 8,160,345 | B2 | 4/2012 | Pavlovskaia et al. |
| 8,170,888 | B2 | 5/2012 | Silverman |
| 8,172,775 | B2 | 5/2012 | Warkentine et al. |
| 8,197,549 | B2 | 6/2012 | Amirouche et al. |
| 8,257,360 | B2 | 9/2012 | Richard et al. |
| 8,265,790 | B2 | 9/2012 | Amiot et al. |
| 8,265,949 | B2 | 9/2012 | Haddad |
| 8,277,455 | B2 | 10/2012 | Couture et al. |
| 8,337,508 | B2 | 12/2012 | Lavallee et al. |
| 8,357,111 | B2 | 1/2013 | Caillouette et al. |
| 8,377,129 | B2 | 2/2013 | Fitz et al. |
| 8,382,765 | B2 | 2/2013 | Axelson et al. |
| 8,386,077 | B2 | 2/2013 | Birkenbach et al. |
| 8,480,679 | B2 | 7/2013 | Park et al. |
| 8,483,469 | B2 | 7/2013 | Pavlovskaia et al. |
| 8,521,252 | B2 | 8/2013 | Diez |
| 8,545,509 | B2 | 10/2013 | Park et al. |
| 8,548,559 | B2 | 10/2013 | Hodgson et al. |
| 8,551,023 | B2 | 10/2013 | Sherman et al. |
| 8,551,099 | B2 | 10/2013 | Lang et al. |
| 8,626,267 | B2 | 1/2014 | Lavallee |
| 8,641,726 | B2 | 2/2014 | Bonutti |
| 8,682,052 | B2 | 3/2014 | Fitz et al. |
| 8,707,963 | B2 | 4/2014 | Davis et al. |
| 8,715,291 | B2 | 5/2014 | Park et al. |
| 8,721,568 | B2 | 5/2014 | Rock et al. |
| 8,777,875 | B2 | 7/2014 | Park |
| 8,801,719 | B2 | 8/2014 | Park et al. |
| 8,801,720 | B2 | 8/2014 | Park et al. |
| 8,832,019 | B2 | 9/2014 | Gao |
| 8,834,490 | B2 | 9/2014 | Bonutti |
| 8,845,645 | B2 | 9/2014 | Wilkinson et al. |
| 8,861,818 | B2 | 10/2014 | Ito et al. |
| 8,880,152 | B2 | 11/2014 | Lavallee |
| 8,885,904 | B2 | 11/2014 | Darrow et al. |
| 8,938,282 | B2 | 1/2015 | Daon et al. |
| 8,951,260 | B2 | 2/2015 | Lang et al. |
| 8,956,355 | B2 | 2/2015 | Edwards et al. |
| 8,965,483 | B2 | 2/2015 | Couture et al. |
| 8,974,468 | B2 | 3/2015 | Borja |
| 8,979,859 | B2 | 3/2015 | Leparmentier et al. |
| 9,002,426 | B2 | 4/2015 | Quaid et al. |
| 9,101,394 | B2 | 8/2015 | Arata et al. |
| 9,119,722 | B1 | 9/2015 | Kusuma |
| 9,125,669 | B2 | 9/2015 | Ranawat et al. |
| 9,167,989 | B2 | 10/2015 | Odermatt et al. |
| 9,168,153 | B2 | 10/2015 | Bettenga |
| 9,173,716 | B2 | 11/2015 | Kasodekar et al. |
| 9,186,292 | B2 | 11/2015 | Besendorfer |
| 9,220,510 | B2 | 12/2015 | Cheal et al. |
| 9,237,951 | B1 | 1/2016 | Hakki |
| 9,241,801 | B1 | 1/2016 | Parry et al. |
| 9,247,998 | B2 | 2/2016 | Hladio et al. |
| 9,248,001 | B2 | 2/2016 | Colombet et al. |
| 9,259,290 | B2 | 2/2016 | Jenkins et al. |
| 9,262,802 | B2 | 2/2016 | Aghazadeh |
| 9,265,447 | B2 | 2/2016 | Stein et al. |
| 9,271,756 | B2 | 3/2016 | Van Der Walt et al. |
| 9,277,968 | B2 | 3/2016 | Min et al. |
| 9,286,355 | B2 | 3/2016 | De Guise et al. |
| 9,289,264 | B2 | 3/2016 | Iorgulescu et al. |
| 9,301,812 | B2 | 4/2016 | Kehres et al. |
| 9,332,987 | B2 | 5/2016 | Leimbach et al. |
| 9,406,134 | B2 | 8/2016 | Klingenbeck-Regn |
| 9,433,425 | B2 | 9/2016 | Wilkinson |
| 9,439,656 | B2 | 9/2016 | Chana et al. |
| 9,517,000 | B2 | 12/2016 | Donhowe et al. |
| 9,532,788 | B2 | 1/2017 | Jordan et al. |
| 9,532,838 | B2 | 1/2017 | Coste-Maniere et al. |
| 9,549,742 | B2 | 1/2017 | Berend et al. |
| 9,549,782 | B2 | 1/2017 | Park et al. |
| 9,554,953 | B2 | 1/2017 | Dirauf et al. |
| 9,561,082 | B2 | 2/2017 | Yen et al. |
| 9,572,682 | B2 | 2/2017 | Aghazadeh |
| 9,585,725 | B2 | 3/2017 | Bonutti |
| 9,585,768 | B2 | 3/2017 | Sherman et al. |
| 9,592,133 | B2 | 3/2017 | Toler et al. |
| 9,597,096 | B2 | 3/2017 | Aghazadeh |
| 9,610,086 | B2 | 4/2017 | Park et al. |
| 9,610,134 | B2 | 4/2017 | Kubiak et al. |
| 9,639,156 | B2 * | 5/2017 | Iorgulescu .......... G06F 3/04847 |
| 9,684,768 | B2 | 6/2017 | Lavallee et al. |
| 9,700,292 | B2 | 7/2017 | Nawana et al. |
| 9,724,165 | B2 | 8/2017 | Arata et al. |
| 9,737,311 | B2 | 8/2017 | Lavallee et al. |
| 9,737,369 | B2 | 8/2017 | Burger et al. |
| 9,763,683 | B2 | 9/2017 | Bonutti |

(56) References Cited

U.S. PATENT DOCUMENTS

| | | |
|---|---|---|
| 9,763,746 B2 | 9/2017 | Deichmann et al. |
| 9,782,226 B2 | 10/2017 | Park et al. |
| 9,782,229 B2 | 10/2017 | Crawford et al. |
| 9,808,356 B2 | 11/2017 | Haight et al. |
| 9,848,896 B2 | 12/2017 | Emslie et al. |
| 9,861,446 B2 | 1/2018 | Lang |
| 9,888,931 B2 | 2/2018 | Bake |
| 9,901,404 B2 | 2/2018 | Park et al. |
| 9,901,463 B2 | 2/2018 | Mahfouz |
| 9,911,187 B2 | 3/2018 | Steinle et al. |
| 9,913,691 B2 | 3/2018 | Brooks |
| 9,913,692 B2 | 3/2018 | Arata et al. |
| 9,916,421 B2 | 3/2018 | Vorhis et al. |
| 9,987,092 B2 | 6/2018 | Hladio et al. |
| 10,010,377 B2 | 7/2018 | Iorgulescu et al. |
| 10,052,164 B2 | 8/2018 | Overmyer |
| 10,070,931 B2 | 9/2018 | Itkowitz et al. |
| 10,070,973 B2 | 9/2018 | Sherman et al. |
| 10,071,488 B2 | 9/2018 | Robinson et al. |
| 10,076,344 B2 | 9/2018 | Toler |
| 10,080,616 B2 | 9/2018 | Wilkinson et al. |
| 10,092,361 B2 | 10/2018 | Ferro et al. |
| 10,102,309 B2 | 10/2018 | Mckinnon et al. |
| 10,117,658 B2 | 11/2018 | Talbot |
| 10,130,375 B2 | 11/2018 | Yager et al. |
| 10,136,950 B2 | 11/2018 | Schoenefeld |
| 10,136,952 B2 | 11/2018 | Couture et al. |
| 10,172,687 B2 | 1/2019 | Garbus et al. |
| 10,194,991 B2 | 2/2019 | Bonny et al. |
| 10,201,320 B2 | 2/2019 | Saget et al. |
| 10,206,714 B2 | 2/2019 | Van Der Walt et al. |
| 10,206,792 B2 | 2/2019 | Sherman et al. |
| 10,226,261 B2 | 3/2019 | Park et al. |
| 10,226,306 B2 | 3/2019 | Itkowitz et al. |
| 10,231,739 B1 | 3/2019 | Bonutti |
| 10,231,786 B2 | 3/2019 | Ferro et al. |
| 10,238,454 B2 | 3/2019 | Boettner et al. |
| 10,271,954 B2 | 4/2019 | Roach et al. |
| 10,272,569 B2 | 4/2019 | Swarup et al. |
| 10,278,777 B1 | 5/2019 | Lang |
| 10,285,683 B2 | 5/2019 | Plaskos et al. |
| 10,307,269 B2 | 6/2019 | Miller |
| 10,368,947 B2 | 8/2019 | Lang |
| 10,416,624 B2 | 9/2019 | Bly et al. |
| 10,420,611 B2 | 9/2019 | Jaramaz et al. |
| 10,426,556 B2 | 10/2019 | Miga et al. |
| 10,441,366 B2 | 10/2019 | Tabandeh et al. |
| 10,441,438 B1 | 10/2019 | Rahman et al. |
| 10,452,238 B2 | 10/2019 | Nikou et al. |
| 10,456,075 B2 | 10/2019 | Auchinleck et al. |
| 10,456,166 B2 | 10/2019 | Cooper et al. |
| 10,463,242 B2 | 11/2019 | Kesten et al. |
| 10,470,838 B2 | 11/2019 | Epstein et al. |
| 10,492,693 B2 | 12/2019 | Irisawa |
| 10,492,798 B2 | 12/2019 | Metzger |
| 10,548,667 B2 | 2/2020 | Flett et al. |
| 10,555,777 B2 | 2/2020 | Griffiths et al. |
| 10,572,733 B2 | 2/2020 | Wells et al. |
| 10,575,910 B2 | 3/2020 | Itkowitz et al. |
| 10,595,880 B2 | 3/2020 | Otto et al. |
| 10,595,887 B2 | 3/2020 | Shelton et al. |
| 10,595,952 B2 * | 3/2020 | Forrest .................. A61B 34/25 |
| 10,610,310 B2 | 4/2020 | Todd et al. |
| 10,610,315 B2 | 4/2020 | Itkowitz et al. |
| 10,610,316 B2 | 4/2020 | Swarup et al. |
| 10,617,479 B2 | 4/2020 | Itkowitz et al. |
| 10,624,807 B2 | 4/2020 | Itkowitz et al. |
| 10,638,970 B2 | 5/2020 | Obma et al. |
| 10,739,963 B2 | 8/2020 | Nikou et al. |
| 10,765,384 B2 | 9/2020 | Wollowick et al. |
| 11,039,893 B2 | 6/2021 | Kostrzewski |
| 11,553,969 B1 | 1/2023 | Lang et al. |
| 2002/0055918 A1 | 5/2002 | Hlathein et al. |
| 2002/0082612 A1 | 6/2002 | Moll et al. |
| 2004/0260301 A1 | 12/2004 | Lionberger et al. |
| 2005/0020941 A1 | 1/2005 | Tarabichi |
| 2005/0113846 A1 | 5/2005 | Carson |
| 2005/0119661 A1 | 6/2005 | Hodgson et al. |
| 2005/0149040 A1 | 7/2005 | Haines et al. |
| 2005/0171545 A1 | 8/2005 | Walsh et al. |
| 2005/0234466 A1 | 10/2005 | Stallings |
| 2005/0251148 A1 | 11/2005 | Friedrich et al. |
| 2006/0015120 A1 | 1/2006 | Richard et al. |
| 2006/0064043 A1 | 3/2006 | Goeggelmann et al. |
| 2006/0200026 A1 | 9/2006 | Wallace et al. |
| 2006/0241405 A1 | 10/2006 | Leitner et al. |
| 2007/0073136 A1 | 3/2007 | Metzger |
| 2007/0123896 A1 | 5/2007 | Wyss et al. |
| 2007/0179626 A1 | 8/2007 | de la Barrera et al. |
| 2008/0004633 A1 | 1/2008 | Arata et al. |
| 2008/0208081 A1 | 8/2008 | Murphy et al. |
| 2008/0249394 A1 | 10/2008 | Giori et al. |
| 2008/0281301 A1 | 11/2008 | DeBoer et al. |
| 2008/0281328 A1 | 11/2008 | Lang et al. |
| 2008/0281426 A1 | 11/2008 | Fitz et al. |
| 2010/0063508 A1 | 3/2010 | Borja et al. |
| 2010/0064216 A1 | 3/2010 | Borja et al. |
| 2010/0145344 A1 | 6/2010 | Jordan et al. |
| 2011/0029091 A1 | 2/2011 | Bojarski et al. |
| 2011/0071528 A1 | 3/2011 | Carson |
| 2011/0071530 A1 | 3/2011 | Carson |
| 2011/0304332 A1 | 12/2011 | Mahfouz |
| 2011/0306986 A1 | 12/2011 | Lee et al. |
| 2012/0143084 A1 | 6/2012 | Shoham |
| 2012/0226198 A1 | 9/2012 | Carson |
| 2012/0226481 A1 | 9/2012 | Carson |
| 2012/0283747 A1 | 11/2012 | Popovic |
| 2013/0072821 A1 | 3/2013 | Odermatt et al. |
| 2013/0085510 A1 | 4/2013 | Stefanchik et al. |
| 2013/0123983 A1 | 5/2013 | Brogaardh |
| 2013/0172905 A1 | 7/2013 | Iorgulescu et al. |
| 2013/0209953 A1 | 8/2013 | Arlinsky et al. |
| 2014/0039520 A1 | 2/2014 | Haider et al. |
| 2014/0073907 A1 | 3/2014 | Kumar et al. |
| 2014/0108983 A1 | 4/2014 | William R et al. |
| 2014/0128727 A1 | 5/2014 | Daon et al. |
| 2014/0135791 A1 | 5/2014 | Nikou et al. |
| 2014/0188240 A1 * | 7/2014 | Lang .................. A61F 2/3662 29/592 |
| 2014/0189508 A1 | 7/2014 | Granchi et al. |
| 2014/0296871 A1 | 10/2014 | Chen et al. |
| 2015/0094736 A1 | 4/2015 | Malackowski et al. |
| 2015/0105782 A1 | 4/2015 | D'Lima et al. |
| 2015/0106024 A1 | 4/2015 | Lightcap et al. |
| 2016/0007836 A1 | 1/2016 | Kikuchi |
| 2016/0022374 A1 | 1/2016 | Haider et al. |
| 2016/0220175 A1 | 8/2016 | Tam et al. |
| 2016/0278868 A1 | 9/2016 | Berend et al. |
| 2016/0338777 A1 | 11/2016 | Penenberg et al. |
| 2017/0014169 A1 | 1/2017 | Dean et al. |
| 2017/0042557 A1 | 2/2017 | Plaskos et al. |
| 2017/0061375 A1 | 3/2017 | Laster et al. |
| 2017/0196571 A1 | 7/2017 | Berend et al. |
| 2017/0252112 A1 | 9/2017 | Crawford et al. |
| 2017/0258532 A1 | 9/2017 | Shalayev et al. |
| 2017/0312099 A1 | 11/2017 | Paszicsnyek |
| 2017/0325973 A1 | 11/2017 | Bonny et al. |
| 2017/0340389 A1 | 11/2017 | Otto et al. |
| 2017/0347922 A1 | 12/2017 | Bhandari |
| 2017/0348008 A1 | 12/2017 | Lavallee et al. |
| 2018/0064496 A1 | 3/2018 | Hladio et al. |
| 2018/0071049 A1 | 3/2018 | Nowatschin et al. |
| 2018/0085135 A1 | 3/2018 | Singh et al. |
| 2018/0085172 A1 | 3/2018 | Bell et al. |
| 2018/0116739 A1 | 5/2018 | Gogarty et al. |
| 2018/0116805 A1 | 5/2018 | Johannaber et al. |
| 2018/0116823 A1 | 5/2018 | Johannaber et al. |
| 2018/0132949 A1 | 5/2018 | Merette et al. |
| 2018/0168750 A1 | 6/2018 | Staunton et al. |
| 2018/0168762 A1 | 6/2018 | Scheib et al. |
| 2018/0177512 A1 | 6/2018 | Hogan et al. |
| 2018/0185100 A1 | 7/2018 | Weinstein et al. |
| 2018/0199995 A1 | 7/2018 | Odermatt et al. |
| 2018/0214180 A1 | 8/2018 | Theodore et al. |

(56) References Cited

U.S. PATENT DOCUMENTS

| | | |
|---|---|---|
| 2018/0221098 A1 | 8/2018 | Forsyth et al. |
| 2018/0250078 A1 | 9/2018 | Shochat et al. |
| 2018/0256256 A1 | 9/2018 | May et al. |
| 2018/0271607 A1 | 9/2018 | Kralicky et al. |
| 2018/0317898 A1 | 11/2018 | Plaskos et al. |
| 2018/0338796 A1 | 11/2018 | Yao et al. |
| 2018/0344409 A1 | 12/2018 | Bonny et al. |
| 2018/0368930 A1 | 12/2018 | Esterberg et al. |
| 2019/0000631 A1 | 1/2019 | Blankevoort et al. |
| 2019/0008599 A1 | 1/2019 | Lynch et al. |
| 2019/0046278 A1 | 2/2019 | Steinle et al. |
| 2019/0066832 A1 | 2/2019 | Kang et al. |
| 2019/0069962 A1 | 3/2019 | Tabandeh et al. |
| 2019/0069963 A1 | 3/2019 | Azizian et al. |
| 2019/0083191 A1 | 3/2019 | Gilhooley et al. |
| 2019/0090952 A1 | 3/2019 | Bonny et al. |
| 2019/0090962 A1 | 3/2019 | Boettner |
| 2019/0099228 A1 | 4/2019 | Keller et al. |
| 2019/0117156 A1 | 4/2019 | Howard et al. |
| 2019/0117407 A1 | 4/2019 | Yang |
| 2019/0122330 A1 | 4/2019 | Saget et al. |
| 2019/0133695 A1 | 5/2019 | Hladio et al. |
| 2019/0147128 A1 | 5/2019 | O'Connor |
| 2019/0175062 A1* | 6/2019 | Rafii-Tari ............... A61B 34/20 |
| 2019/0175283 A1 | 6/2019 | Bonny et al. |
| 2019/0176334 A1 | 6/2019 | Zhou et al. |
| 2019/0200900 A1 | 7/2019 | Thelen et al. |
| 2019/0201101 A1 | 7/2019 | Hafez |
| 2019/0201214 A1 | 7/2019 | Miller et al. |
| 2019/0209079 A1 | 7/2019 | Delport |
| 2019/0216520 A1 | 7/2019 | Babak et al. |
| 2019/0223962 A1 | 7/2019 | Roldan et al. |
| 2019/0224016 A1 | 7/2019 | Walker et al. |
| 2019/0240045 A1 | 8/2019 | Couture |
| 2019/0240046 A1 | 8/2019 | Couture |
| 2019/0254756 A1 | 8/2019 | Zhang et al. |
| 2019/0269476 A1* | 9/2019 | Bowling ............... A61B 34/20 |
| 2019/0272917 A1 | 9/2019 | Couture et al. |
| 2019/0274662 A1 | 9/2019 | Rockman et al. |
| 2019/0274762 A1 | 9/2019 | Kim et al. |
| 2019/0290198 A1 | 9/2019 | Belson et al. |
| 2019/0311542 A1 | 10/2019 | Douglas et al. |
| 2019/0325386 A1 | 10/2019 | Laster et al. |
| 2019/0336220 A1 | 11/2019 | Hladio et al. |
| 2019/0365481 A1 | 12/2019 | Otto et al. |
| 2019/0374130 A1 | 12/2019 | Bydlon et al. |
| 2019/0380792 A1 | 12/2019 | Poltaretskyi et al. |
| 2019/0388153 A1 | 12/2019 | Running et al. |
| 2019/0388157 A1 | 12/2019 | Shameli et al. |
| 2020/0000400 A1 | 1/2020 | Mckinnon et al. |
| 2020/0015598 A1 | 1/2020 | Hondori et al. |
| 2020/0030036 A1 | 1/2020 | Forstein |
| 2020/0060772 A1 | 2/2020 | Konh et al. |
| 2020/0060773 A1 | 2/2020 | Barral et al. |
| 2020/0100848 A1 | 4/2020 | Zuhars et al. |
| 2020/0113583 A1 | 4/2020 | Philipp et al. |
| 2020/0129311 A1 | 4/2020 | Singh et al. |
| 2020/0268453 A1 | 8/2020 | Fuerst et al. |
| 2020/0305978 A1 | 10/2020 | Tan et al. |
| 2020/0305979 A1 | 10/2020 | Crawford et al. |
| 2020/0323540 A1 | 10/2020 | Kang et al. |
| 2020/0352529 A1 | 11/2020 | Wollowick et al. |
| 2021/0068845 A1 | 3/2021 | Schers et al. |
| 2021/0282859 A1* | 9/2021 | Abbaschian ............ A61B 34/25 |
| 2021/0361298 A1 | 11/2021 | Patel et al. |
| 2022/0031398 A1 | 2/2022 | Zheng et al. |
| 2022/0071720 A1 | 3/2022 | Sexson et al. |
| 2022/0148739 A1 | 5/2022 | Farley et al. |
| 2022/0361972 A1 | 11/2022 | Armand et al. |
| 2022/0395340 A1 | 12/2022 | Dumpe |
| 2023/0146679 A1 | 5/2023 | Lavallée et al. |

FOREIGN PATENT DOCUMENTS

| | | |
|---|---|---|
| EP | 1 226 788 B1 | 10/2006 |
| EP | 1 755 466 B1 | 12/2007 |
| EP | 2 007 291 A2 | 12/2008 |
| EP | 2 156 794 A1 | 2/2010 |
| EP | 2 384 714 A1 | 11/2011 |
| EP | 1 919 390 B1 | 12/2012 |
| EP | 1 841 372 B1 | 9/2017 |
| EP | 3 510 927 A1 | 7/2019 |
| EP | 3 334 383 B1 | 4/2020 |
| WO | WO-95/31148 A1 | 11/1995 |
| WO | WO-2004/070580 A2 | 8/2004 |
| WO | WO-2006/078236 A1 | 7/2006 |
| WO | WO-2007/092841 A1 | 8/2007 |
| WO | WO-2012/082164 A1 | 6/2012 |
| WO | WO-2012/101286 A1 | 8/2012 |
| WO | WO-2015/057814 A1 | 4/2015 |
| WO | WO-2016/146768 A1 | 9/2016 |
| WO | WO-2016/198844 A1 | 12/2016 |
| WO | WO-2017/076886 A1 | 5/2017 |
| WO | WO-2017/108776 A1 | 6/2017 |
| WO | WO-2017/115235 A1 | 7/2017 |
| WO | WO-2017/124043 A1 | 7/2017 |
| WO | WO-2017/147596 A1 | 8/2017 |
| WO | WO-2017/179075 A1 | 10/2017 |
| WO | WO-2018/085694 A1 | 5/2018 |
| WO | WO-2018/085900 A1 | 5/2018 |
| WO | WO-2018/095499 A1 | 5/2018 |
| WO | WO-2018/104704 A1 | 6/2018 |
| WO | WO-2018/161120 A1 | 9/2018 |
| WO | WO-2019/006370 A1 | 1/2019 |
| WO | WO-2019/032828 A2 | 2/2019 |
| WO | WO-2019/068194 A1 | 4/2019 |
| WO | WO-2019/079634 A1 | 4/2019 |
| WO | WO-2019/081915 A1 | 5/2019 |
| WO | WO-2019/135805 A1 | 7/2019 |
| WO | WO-2019/148154 A1 | 8/2019 |
| WO | WO-2019/191722 A1 | 10/2019 |
| WO | WO-2019/224745 A1 | 11/2019 |
| WO | WO-2019/241516 A1 | 12/2019 |
| WO | WO-2019/245849 A1 | 12/2019 |
| WO | WO-2019/245851 A1 | 12/2019 |
| WO | WO-2020/033568 A2 | 2/2020 |
| WO | WO-2020/056443 A1 | 3/2020 |
| WO | WO-2020/065209 A1 | 4/2020 |
| WO | WO-2020/227832 A1 | 11/2020 |

OTHER PUBLICATIONS

International Search Report and Written Opinion for International Application No. PCT/US2021/057045, mailed Feb. 14, 2022, 17 pages.

International Search Report and Written Opinion for International Application No. PCT/US2021/057065, mailed Feb. 18, 2022, 19 pages.

* cited by examiner

ROBOTIC SURGICAL SYSTEM WITH CUT SELECTION LOGIC

CROSS-REFERENCE TO RELATED APPLICATIONS

This application claims the benefit of and priority to U.S. Provisional Patent Application No. 63/107,781, filed Oct. 30, 2020, U.S. Provisional Patent Application No. 63/125,481 filed Dec. 15, 2020, U.S. Provisional Patent Application No. 63/131,654 filed Dec. 29, 2020, and U.S. Provisional Patent Application No. 63/189,508 filed May 17, 2021, the entire disclosures of which are incorporated by reference herein.

BACKGROUND

The present disclosure relates generally to surgical systems for orthopedic surgeries, for example surgical systems that facilitate joint replacement procedures. Joint replacement procedures (arthroplasty procedures) are widely used to treat osteoarthritis and other damage to a patient's joint by replacing portions of the joint with prosthetic components. Joint replacement procedures can include procedures to replace hips, knees, shoulders, or other joints with one or more prosthetic components.

One possible tool for use in an arthroplasty procedure is a robotically-assisted surgical system. A robotically-assisted surgical system typically includes a robotic device that is used to prepare a patient's anatomy to receive an implant, a tracking system configured to monitor the location of the robotic device relative to the patient's anatomy, and a computing system configured to monitor and control the robotic device. Robotically-assisted surgical systems, in various forms, autonomously carry out surgical tasks, provide force feedback to a user manipulating a surgical device to complete surgical tasks, augment surgeon dexterity and precision, and/or provide other navigational cues to facilitate safe and accurate surgical operations.

A surgical plan is typically established prior to performing a surgical procedure with a robotically-assisted surgical system. Based on the surgical plan, the surgical system guides, controls, or limits movements of the surgical device during portions of the surgical procedure. Guidance and/or control of the surgical device serves to assist the surgeon during implementation of the surgical plan. Various features enabling improved planning, improved intra-operative assessments of the patient biomechanics, intraoperative plan adjustments, etc. for use with robotically-assisted surgical systems or other computer-assisted surgical systems may be advantageous.

SUMMARY

Figure 1:
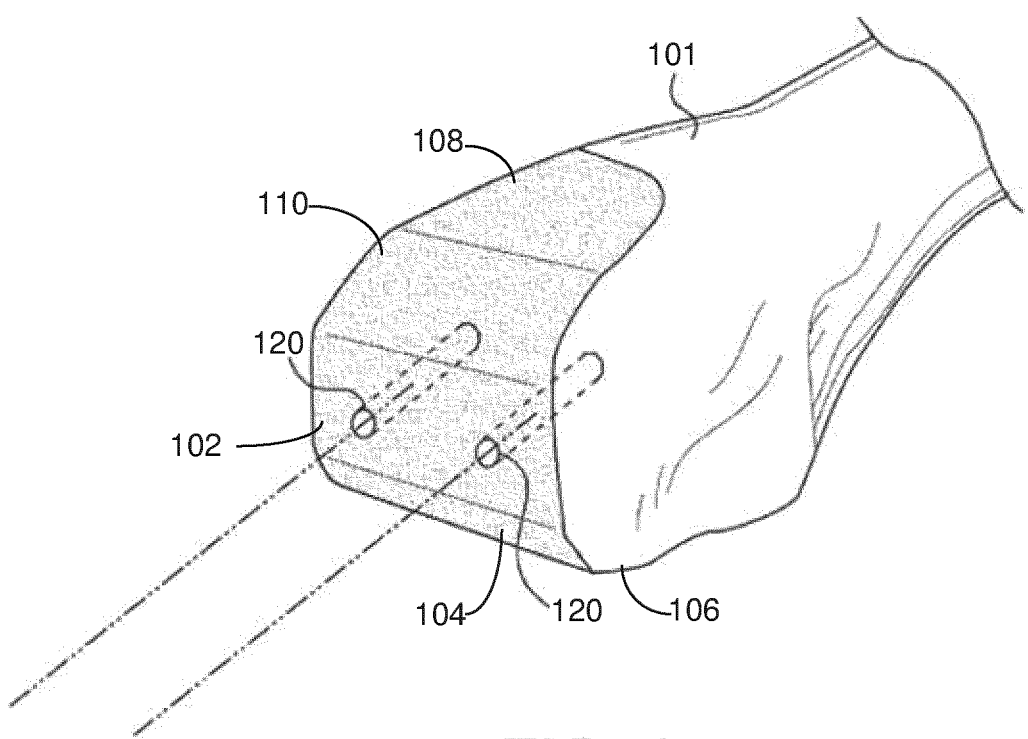
FIG. 1 is a perspective view of a femur prepared to receive an implant component, according to an exemplary embodiment.

One implementation of the present disclosure is a method of controlling a surgical system. The method includes obtaining a surgical plan containing a plurality of planned cuts, receiving a first cutting tool from a plurality of cutting tools at a surgical device, collecting a first checkpoint by tracking a probe as the probe contacts a first predefined point on the first cutting tool, collecting a second checkpoint by tracking the probe as the probe contacts a second predefined point at a first bone of a patient, automatically selecting a first planned cut from the plurality of planned cuts based on the first checkpoint and the second checkpoint, and guiding execution of the first planned cut using the first cutting tool.

Another implementation of the present disclosure is a surgical system. The surgical system includes a surgical device, a first cutting tool selected from a plurality of cutting tools interchangeably attachable to the surgical device, a probe, a tracking system configured to collect tracking data indicating positions of the probe, and circuitry. The circuitry is configured to receive the tracking data, determine a first checkpoint based on a first position of the probe as the probe contacts a first predetermined point on the first cutting tool, determine a second checkpoint based on a second position of the probe as the probe contacts a second predetermined point at a first bone of a patient, select a first planned cut from a plurality of planned cuts based on the first checkpoint and the second checkpoint, and guide execution of the first planned cut using the surgical device and the first cutting tool.

Another implementation of the present disclosure is one or more non-transitory computer-readable media storing program instructions that, when executed by one or more processors, causes the one or more processors to perform operations relating to controlling a surgical system. The operations include obtaining a surgical plan comprising a plurality of planned cuts, collecting a first checkpoint by tracking a probe as the probe contacts a first predefined point on a first cutting tool attached to a surgical device, collecting a second checkpoint by tracking the probe as the probe contacts a second predefined point at a bone of the patient, automatically selecting a first planned cut from a plurality of planned cuts based on the first checkpoint and the second checkpoint, and, in response, providing guidance that facilitates execution of the first planned cut using the first cutting tool.

DETAILED DESCRIPTION

Presently preferred embodiments of the invention are illustrated in the drawings. An effort has been made to use the same or like reference numbers throughout the drawings to refer to the same or like parts. Although this specification refers primarily to a robotic arm for orthopedic joint replacement, it should be understood that the subject matter described herein is applicable to other types of robotic systems, including those used for non-surgical applications, as well as for procedures directed to other anatomical regions, for example spinal or dental procedures.

Referring now to FIG. 1, a femur 101 as modified during a knee arthroplasty procedure is shown, according to an exemplary embodiment. As shown in FIG. 1, the femur 101 has been modified with multiple planar cuts. In the example shown, the femur 101 has been modified by five substantially planar cuts to create five substantially planar surfaces, namely distal surface 102, posterior chamfer surface 104, posterior surface 106, anterior surface 108, and anterior chamfer surface 110. The planar surfaces may be achieved using a sagittal saw or other surgical device, for example a surgical device coupled to a robotic device as in the examples described below. The planar surfaces 102-110 are created such that the planar surfaces 102-110 will mate with corresponding surfaces of a femoral implant component. The positions and angular orientations of the planar surfaces 102-110 may determine the alignment and positioning of the implant component. Accordingly, operating a surgical device to create the planar surfaces 102-110 with a high degree of accuracy may improve the outcome of a joint replacement procedure.

As shown in FIG. 1, the femur 101 has also been modified to have a pair of pilot holes 120. The pilot holes 120 extend into the femur 101 and are created such that the pilot holes 120 can receive a screw, a projection extending from a surface of an implant component, or other structure configured to facilitate coupling of an implant component to the femur 101. The pilot holes 120 may be created using a drill, spherical burr, or other surgical device as described below. The pilot holes 120 may have a pre-planned position, orientation, and depth, which facilitates secure coupling of the implant component to the bone in a desired position and orientation. In some cases, the pilot holes 120 are planned to intersect with higher-density areas of a bone and/or to avoid other implant components and/or sensitive anatomical features. Accordingly, operating a surgical device to create the pilot holes 120 with a high degree of accuracy may improve the outcome of a joint replacement procedure.

A tibia may also be modified during a joint replacement procedure. For example, a planar surface may be created on the tibia at the knee joint to prepare the tibia to mate with a tibial implant component. In some embodiments, one or more pilot holes 120 or other recess (e.g., fin-shaped recess) may also be created in the tibia to facilitate secure coupling of an implant component tot eh bone.

In some embodiments, the systems and methods described herein provide robotic assistance for creating the planar surfaces 102-110 and the pilot holes 120 at the femur 101, and/or a planar surface and/or pilot holes 120 or other recess on a tibia. It should be understood that the creation of five planar cuts and two cylindrical pilot holes as shown in FIG. 1 is an example only, and that the systems and methods described herein may be adapted to plan and facilitate creation of any number of planar or non-planar cuts, any number of pilot holes, any combination thereof, etc., for preparation of any bone and/or joint in various embodiments. For example, in a hip or shoulder arthroplasty procedure, a spherical burr may be used in accordance with the systems and methods herein to ream a curved surface configured to receive a curved implant cup. Furthermore, in other embodiments, the systems and methods described herein may be used to facilitate placement an implant component relative to a bone (e.g., to facilitate impaction of cup implant in a hip arthroplasty procedure). Many such surgical and non-surgical implementations are within the scope of the present disclosure.

The positions and orientations of the planar surfaces 102-110, pilot holes 120, and any other surfaces or recesses created on bones of the knee joint can affect how well implant components mate to the bone as well as the resulting biomechanics for the patient after completion of the surgery. Tension on soft tissue can also be affected. Accordingly, systems and methods for planning the cuts which create these surfaces, facilitating intra-operative adjustments to the surgical plan, and providing robotic-assistance or other guidance for facilitating accurate creation of the planar surfaces 102-110, other surfaces, pilot holes 120, or other recesses can make surgical procedures easier and more efficient for healthcare providers and improve surgical outcomes.

Figure 2:
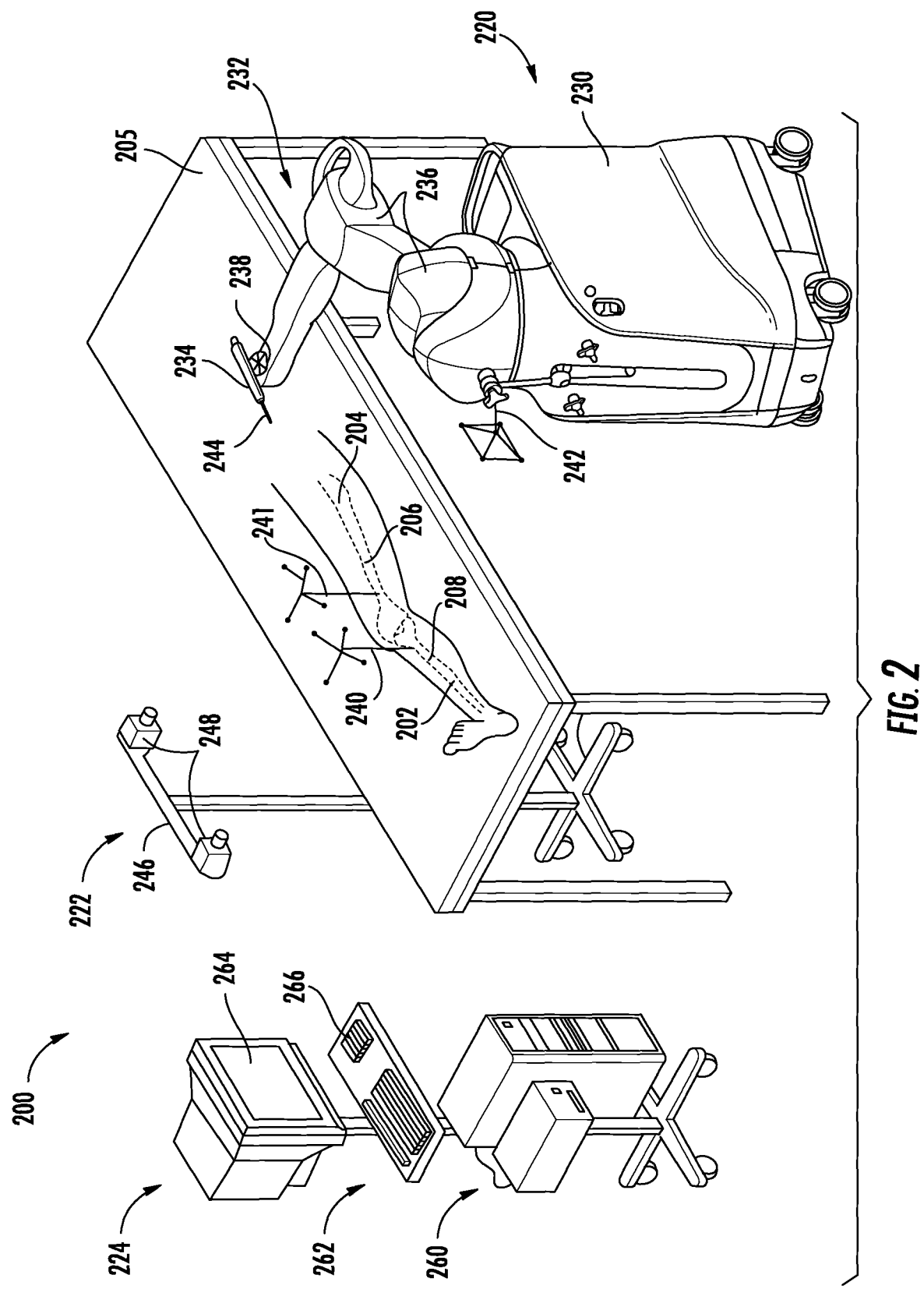
FIG. 2 is an illustration of a surgical system, according to an exemplary embodiment.

Referring now to FIG. 2, a surgical system 200 for orthopedic surgery is shown, according to an exemplary embodiment. In general, the surgical system 200 is configured to facilitate the planning and execution of a surgical plan, for example to facilitate a joint-related procedure. As shown in FIG. 2, the surgical system 200 is set up to treat a leg 202 of a patient 204 sitting or lying on table 205. In the illustration shown in FIG. 2, the leg 202 includes femur 206 (e.g., femur 101 of FIG. 1) and tibia 208, between which a prosthetic knee implant is to be implanted in a total knee arthroscopy procedure. In other scenarios, the surgical system 200 is set up to treat a hip of a patient, e.g., the femur and the pelvis of the patient. Additionally, in still other scenarios, the surgical system 200 is set up to treat a shoulder of a patient, e.g., to facilitate replacement and/or augmentation of components of a shoulder joint (e.g., to facilitate placement of a humeral component, a glenoid component, and a graft or implant augment). Various other anatomical regions and procedures are also possible.

The robotic device 220 is configured to modify a patient's anatomy (e.g., femur 206 of patient 204) under the control of the computing system 224. One embodiment of the robotic device 220 is a haptic device. "Haptic" refers to a sense of touch, and the field of haptics relates to, among other things, human interactive devices that provide feedback to an operator. Feedback may include tactile sensations such as, for example, vibration. Feedback may also include providing force to a user, such as a positive force or a resistance to movement. One use of haptics is to provide a user of the device with guidance or limits for manipulation of that device. For example, a haptic device may be coupled to a surgical device, which can be manipulated by a surgeon to perform a surgical procedure. The surgeon's manipulation of the surgical device can be guided or limited through the use of haptics to provide feedback to the surgeon during manipulation of the surgical device.

Another embodiment of the robotic device 220 is an autonomous or semi-autonomous robot. "Autonomous" refers to a robotic device's ability to act independently or semi-independently of human control by gathering information about its situation, determining a course of action, and automatically carrying out that course of action. For example, in such an embodiment, the robotic device 220, in communication with the tracking system 222 and the computing system 224, may autonomously complete the series of femoral cuts mentioned above without direct human intervention.

The robotic device 220 includes a base 230, a robotic arm 232, and a surgical device 234, and is communicably coupled to the computing system 224 and the tracking system 222. The base 230 provides a moveable foundation for the robotic arm 232, allowing the robotic arm 232 and the surgical device 234 to be repositioned as needed relative to the patient 204 and the table 205. The base 230 may also contain power systems, computing elements, motors, and other electronic or mechanical system necessary for the functions of the robotic arm 232 and the surgical device 234 described below.

The robotic arm 232 is configured to support the surgical device 234 and provide a force as instructed by the computing system 224. In some embodiments, the robotic arm 232 allows a user to manipulate the surgical device and provides force feedback to the user. In such an embodiment, the robotic arm 232 includes joints 236 and mount 238 that include motors, actuators, or other mechanisms configured to allow a user to freely translate and rotate the robotic arm 232 and surgical device 234 through allowable poses while providing force feedback to constrain or prevent some movements of the robotic arm 232 and surgical device 234 as instructed by computing system 224. As described in detail below, the robotic arm 232 thereby allows a surgeon to have full control over the surgical device 234 within a control object while providing force feedback along a boundary of that object (e.g., a vibration, a force preventing or resisting penetration of the boundary). In some embodiments, the robotic arm 232 is configured to move the surgical device to a new pose automatically without direct user manipulation, as instructed by computing system 224, in order to position the robotic arm 232 as needed and/or complete certain surgical tasks, including, for example, cuts in a femur 206.

The surgical device 234 is configured to cut, burr, grind, drill, partially resect, reshape, and/or otherwise modify a bone. The surgical device 234 may be any suitable tool, and may be one of multiple tools interchangeably connectable to robotic device 220. For example, as shown in FIG. 2 the surgical device 234 includes a spherical burr 244. In other examples, the surgical device 234 may also be a sagittal saw, for example with a blade aligned parallel with a tool axis or perpendicular to the tool axis. The surgical device 234 may also be a drill, for example with a rotary bit aligned parallel with a tool axis or perpendicular to the tool axis. The surgical device 234 may also be a holding arm or other support configured to hold an implant component (e.g., cup 28a, implant augment, etc.) in position while the implant component is screwed to a bone, adhered (e.g., cemented) to a bone or other implant component, or otherwise installed in a preferred position. In some embodiments, the surgical device 234 is an impaction tool configured to provide an impaction force to a cup implant to facilitate fixation of the cup implant to a pelvis in a planned location and orientation.

Tracking system 222 is configured track the patient's anatomy (e.g., femur 206 and tibia 208) and the robotic device 220 (e.g., surgical device 234 and/or robotic arm 232) to enable control of the surgical device 234 coupled to the robotic arm 232, to determine a position and orientation of modifications or other results made by the surgical device 234, and allow a user to visualize the bones (e.g., femur 206, the tibia 208, pelvis, humerus, scapula, etc. as applicable in various procedures), the surgical device 234, and/or the robotic arm 232 on a display of the computing system 224. The tracking system 222 can also be used to collect biomechanical measurements relating to the patient's anatomy, assess joint gap distances, identify a hip center point, assess native or corrected joint deformities, or otherwise collect information relating to the relative poses of anatomical features. More particularly, the tracking system 222 determines a position and orientation (e.g., pose) of objects (e.g., surgical device 234, femur 206) with respect to a coordinate frame of reference and tracks (e.g., continuously determines) the pose of the objects during a surgical procedure. According to various embodiments, the tracking system 222 may be any type of navigation system, including a non-mechanical tracking system (e.g., an optical tracking system), a mechanical tracking system (e.g., tracking based on measuring the relative angles of joints 236 of the robotic arm 232), or any combination of non-mechanical and mechanical tracking systems.

In the embodiment shown in FIG. 2, the tracking system 222 includes an optical tracking system. Accordingly, tracking system 222 includes a first fiducial tree 240 coupled to the tibia 208, a second fiducial tree 241 coupled to the femur 206, a third fiducial tree 242 coupled to the base 230, one or more fiducials attachable to surgical device 234, and a detection device 246 configured to detect the three-dimensional position of fiducials (e.g., markers on fiducial trees 240-242). Fiducial trees 240, 241 may be coupled to other bones as suitable for various procedures (e.g., pelvis and femur in a hip arthroplasty procedure). Detection device 246 may be an optical detector such as a camera or infrared sensor. The fiducial trees 240-242 include fiducials, which are markers configured to show up clearly to the optical detector and/or be easily detectable by an image processing system using data from the optical detector, for example by being highly reflective of infrared radiation (e.g., emitted by an element of tracking system 222). In some embodiments, the markers are active light emitting diodes. A stereoscopic arrangement of cameras 248 on detection device 246 allows the position of each fiducial to be determined in 3D-space through a triangulation approach in the example shown. Each fiducial has a geometric relationship to a corresponding object, such that tracking of the fiducials allows for the tracking of the object (e.g., tracking the second fiducial tree 241 allows the tracking system 222 to track the femur 206), and the tracking system 222 may be configured to carry out a registration process to determine or verify this geometric relationship. Unique arrangements of the fiducials in the fiducial trees 240-242 (e.g., the fiducials in the first fiducial tree 240 are arranged in a different geometry than fiducials in the second fiducial tree 241) allows for distinguishing the fiducial trees, and therefore the objects being tracked, from one another.

Using the tracking system 222 of FIG. 2 or some other approach to surgical navigation and tracking, the surgical system 200 can determine the position of the surgical device 234 relative to a patient's anatomical feature, for example femur 206, as the surgical device 234 is used to modify the anatomical feature or otherwise facilitate the surgical procedure. Additionally, using the tracking system 222 of FIG. 2 or some other approach to surgical navigation and tracking, the surgical system 200 can determine the relative poses of the tracked bones.

The computing system 224 is configured to create a surgical plan, control the robotic device 220 in accordance with the surgical plan to make one or more bone modifications and/or facilitate implantation of one or more prosthetic components. Accordingly, the computing system 224 is communicably coupled to the tracking system 222 and the robotic device 220 to facilitate electronic communication between the robotic device 220, the tracking system 222, and the computing system 224. Further, the computing system 224 may be connected to a network to receive information related to a patient's medical history or other patient profile information, medical imaging, surgical plans, surgical procedures, and to perform various functions related to performance of surgical procedures, for example by accessing an electronic health records system. Computing system 224 includes processing circuit 260 and input/output device 262. Computing system 224 may include circuitry configured to enable the operations described herein, for example using processing circuit 260 and/or input/output device 262.

The input/output device 262 is configured to receive user input and display output as needed for the functions and processes described herein. As shown in FIG. 2, input/output device 262 includes a display 264 and a keyboard 266. The display 264 is configured to display graphical user interfaces generated by the processing circuit 260 that include, for example, information about surgical plans, medical imaging, settings and other options for surgical system 200, status information relating to the tracking system 222 and the robotic device 220, and tracking visualizations based on data supplied by tracking system 222. The keyboard 266 is configured to receive user input to those graphical user interfaces to control one or more functions of the surgical system 200.

The processing circuit 260 includes a processor and memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer-readable media for completing or facilitating the various processes and functions described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to the processor via the processing circuit 260 and includes computer-readable media for executing (e.g., by the processing circuit 260 and/or processor) one or more processes described herein, for example non-transitory computer-readable media.

More particularly, processing circuit 260 is configured to facilitate the creation of a preoperative surgical plan prior to the surgical procedure. According to some embodiments, the preoperative surgical plan is developed utilizing a three-dimensional representation of a patient's anatomy, also referred to herein as a "virtual bone model." A "virtual bone model" may include virtual representations of cartilage or other tissue in addition to bone. To obtain the virtual bone model, the processing circuit 260 receives imaging data of the patient's anatomy on which the surgical procedure is to be performed. The imaging data may be created using any suitable medical imaging technique to image the relevant anatomical feature, including computed tomography (CT), magnetic resonance imaging (MM), and/or ultrasound. The imaging data is then segmented (e.g., the regions in the imaging corresponding to different anatomical features are distinguished) to obtain the virtual bone model. For example, MM-based scan data of a joint can be segmented to distinguish bone from surrounding ligaments, cartilage, previously-implanted prosthetic components, and other tissue to obtain a three-dimensional model of the imaged bone.

Alternatively, the virtual bone model may be obtained by selecting a three-dimensional model from a database or library of bone models. In one embodiment, the user may use input/output device 262 to select an appropriate model. In another embodiment, the processing circuit 260 may execute stored instructions to select an appropriate model based on images or other information provided about the patient. The selected bone model(s) from the database can then be deformed based on specific patient characteristics, creating a virtual bone model for use in surgical planning and implementation as described herein.

A preoperative surgical plan can then be created based on the virtual bone model. The surgical plan may be automatically generated by the processing circuit 260, input by a user via input/output device 262, or some combination of the two (e.g., the processing circuit 260 limits some features of user-created plans, generates a plan that a user can modify, etc.). In some embodiments, the surgical plan may be generated and/or modified based on distraction force measurements collected intraoperatively.

The preoperative surgical plan includes the desired cuts, holes, surfaces, burrs, or other modifications to a patient's anatomy to be made using the surgical system 200. For example, for a total knee arthroscopy procedure, the preoperative plan may include the cuts necessary to form, on a femur, a distal surface, a posterior chamfer surface, a posterior surface, an anterior surface, and an anterior chamfer surface in relative orientations and positions suitable to be mated to corresponding surfaces of the prosthetic to be joined to the femur during the surgical procedure, as well as cuts necessary to form, on the tibia, surface(s) suitable to mate to the prosthetic to be joined to the tibia during the surgical procedure. As another example, the preoperative plan may include the modifications necessary to create holes (e.g., pilot holes 120) in a bone. As another example, in a hip arthroplasty procedure, the surgical plan may include the burr necessary to form one or more surfaces on the acetabular region of the pelvis to receive a cup and, in suitable cases, an implant augment. Accordingly, the processing circuit 260 may receive, access, and/or store a model of the prosthetic to facilitate the generation of surgical plans. In some embodiments, the processing circuit facilitate intraoperative modifications to the preoperative plant.

The processing circuit 260 is further configured to generate a control object for the robotic device 220 in accordance with the surgical plan. The control object may take various forms according to the various types of possible robotic devices (e.g., haptic, autonomous). For example, in some embodiments, the control object defines instructions for the robotic device 220 to control the robotic device 220 to move within the control object (e.g., to autonomously make one or more cuts of the surgical plan guided by feedback from the tracking system 222). In some embodiments, the control object includes a visualization of the surgical plan and the robotic device 220 on the display 264 to facilitate surgical navigation and help guide a surgeon to follow the surgical plan (e.g., without active control or force feedback of the robotic device). In embodiments where the robotic device 220 is a haptic device, the control object may be a haptic object as described in the following paragraphs.

In an embodiment where the robotic device 220 is a haptic device, the processing circuit 260 is further configured to generate one or more haptic objects based on the preoperative surgical plan to assist the surgeon during implementation of the surgical plan by enabling constraint of the surgical device 234 during the surgical procedure. A haptic object may be formed in one, two, or three dimensions. For example, a haptic object can be a line, a plane, or a three-dimensional volume. A haptic object may be curved with curved surfaces and/or have flat surfaces, and can be any shape, for example a funnel shape. Haptic objects can be created to represent a variety of desired outcomes for movement of the surgical device 234 during the surgical procedure. One or more of the boundaries of a three-dimensional haptic object may represent one or more modifications, such as cuts, to be created on the surface of a bone. A planar haptic object may represent a modification, such as a cut, to be created on the surface of a bone. A curved haptic object may represent a resulting surface of a bone as modified to receive a cup implant and/or implant augment. A line haptic object may correspond to a pilot hole to be made in a bone to prepare the bone to receive a screw or other projection.

In an embodiment where the robotic device 220 is a haptic device, the processing circuit 260 is further configured to generate a virtual tool representation of the surgical device 234. The virtual tool includes one or more haptic interaction points (HIPs), which represent and are associated with locations on the surgical device 234. In an embodiment in which the surgical device 234 is a spherical burr (e.g., as shown in FIG. 2), a HIP may represent the center of the spherical burr. Where one HIP is used to virtually represent a surgical device, the HIP may be referred to herein as a tool center point (TCP). If the surgical device 234 is an irregular shape, for example as for a sagittal saw, the virtual representation of the sagittal saw may include numerous HIPs. Using multiple HIPs to generate haptic forces (e.g. positive force feedback or resistance to movement) on a surgical device is described in U.S. application Ser. No. 13/339,369, titled "System and Method for Providing Substantially Stable Haptics," filed Dec. 28, 2011, and hereby incorporated by reference herein in its entirety. In one embodiment of the present invention, a virtual tool representing a sagittal saw includes eleven HIPs. As used herein, references to an "HIP" are deemed to also include references to "one or more HIPs." As described below, relationships between HIPs and haptic objects enable the surgical system 200 to constrain the surgical device 234.

Prior to performance of the surgical procedure, the patient's anatomy (e.g., femur 206) is registered to the virtual bone model of the patient's anatomy by any known registration technique. One possible registration technique is point-based registration, as described in U.S. Pat. No. 8,010,180, titled "Haptic Guidance System and Method," granted Aug. 30, 2011, and hereby incorporated by reference herein in its entirety. Alternatively, registration may be accomplished by 2D/3D registration utilizing a hand-held radiographic imaging device, as described in U.S. application Ser. No. 13/562,163, titled "Radiographic Imaging Device," filed Jul. 30, 2012, and hereby incorporated by reference herein in its entirety. Registration also includes registration of the surgical device 234 to a virtual tool representation of the surgical device 234, so that the surgical system 200 can determine and monitor the pose of the surgical device 234 relative to the patient (e.g., to femur 206). Registration of allows for accurate navigation, control, and/or force feedback during the surgical procedure.

The processing circuit 260 is configured to monitor the virtual positions of the virtual tool representation, the virtual bone model, and the control object (e.g., virtual haptic objects) corresponding to the real-world positions of the patient's bone (e.g., femur 206), the surgical device 234, and one or more lines, planes, or three-dimensional spaces defined by forces created by robotic device 220. For example, if the patient's anatomy moves during the surgical procedure as tracked by the tracking system 222, the processing circuit 260 correspondingly moves the virtual bone model. The virtual bone model therefore corresponds to, or is associated with, the patient's actual (i.e. physical) anatomy and the position and orientation of that anatomy in real/physical space. Similarly, any haptic objects, control objects, or other planned automated robotic device motions created during surgical planning that are linked to cuts, modifications, etc. to be made to that anatomy also move in correspondence with the patient's anatomy. In some embodiments, the surgical system 200 includes a clamp or brace to substantially immobilize the femur 206 to minimize the need to track and process motion of the femur 206.

For embodiments where the robotic device 220 is a haptic device, the surgical system 200 is configured to constrain the surgical device 234 based on relationships between HIPs and haptic objects. That is, when the processing circuit 260 uses data supplied by tracking system 222 to detect that a user is manipulating the surgical device 234 to bring a HIP in virtual contact with a haptic object, the processing circuit 260 generates a control signal to the robotic arm 232 to provide haptic feedback (e.g., a force, a vibration) to the user to communicate a constraint on the movement of the surgical device 234. In general, the term "constrain," as used herein, is used to describe a tendency to restrict movement. However, the form of constraint imposed on surgical device 234 depends on the form of the relevant haptic object. A haptic object may be formed in any desirable shape or configuration. As noted above, three exemplary embodiments include a line, plane, or three-dimensional volume. In one embodiment, the surgical device 234 is constrained because a HIP of surgical device 234 is restricted to movement along a linear haptic object. In another embodiment, the haptic object is a three-dimensional volume and the surgical device 234 may be constrained by substantially preventing movement of the HIP outside of the volume enclosed by the walls of the three-dimensional haptic object. In another embodiment, the surgical device 234 is constrained because a planar haptic object substantially prevents movement of the HIP outside of the plane and outside of the boundaries of the planar haptic object. For example, the processing circuit 260 can establish a planar haptic object corresponding to a planned planar distal cut needed to create a distal surface on the femur 206 in order to confine the surgical device 234 substantially to the plane needed to carry out the planned distal cut.

For embodiments where the robotic device 220 is an autonomous device, the surgical system 200 is configured to autonomously move and operate the surgical device 234 in accordance with the control object. For example, the control object may define areas relative to the femur 206 for which a cut should be made. In such a case, one or more motors, actuators, and/or other mechanisms of the robotic arm 232 and the surgical device 234 are controllable to cause the surgical device 234 to move and operate as necessary within the control object to make a planned cut, for example using tracking data from the tracking system 222 to allow for closed-loop control.

Figure 3:
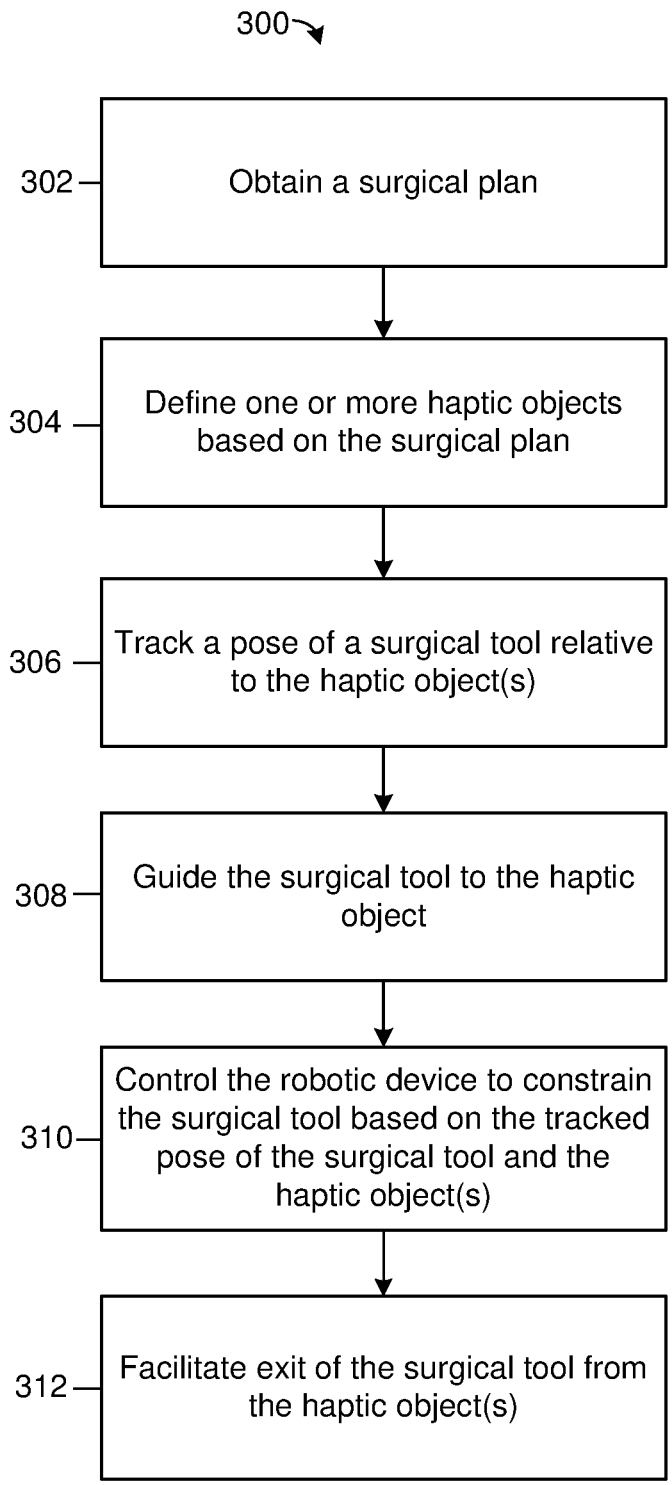
FIG. 3 is a flowchart of a first process that can be executed by the surgical system of FIG. 2, according to an exemplary embodiment.

Referring now to FIG. 3, a flowchart of a process 300 that can be executed by the surgical system 200 of FIG. 2 is shown, according to an exemplary embodiment. Process 300 may be adapted to facilitate various surgical procedures, including total and partial joint replacement surgeries.

At step 302, a surgical plan is obtained. The surgical plan (e.g., a computer-readable data file) may define a desired outcome of bone modifications, for example defined based on a desired position of prosthetic components relative to the patient's anatomy. For example, in the case of a knee arthroplasty procedure, the surgical plan may provide planned positions and orientations of the planar surfaces 102-110 and the pilot holes 120 as shown in FIG. 1. The surgical plan may be generated based on medical imaging, 3D modeling, surgeon input, etc.

At step 304, one or more control boundaries, such as haptic objects, are defined based on the surgical plan. The one or more haptic objects may be one-dimensional (e.g., a line haptic), two dimensional (e.g., planar), or three dimensional (e.g., cylindrical, funnel-shaped, curved, etc.). The haptic objects may represent planned bone modifications (e.g., a haptic object for each of the planar surfaces 102-110 and each of the pilot holes 120 shown in FIG. 1), implant components, surgical approach trajectories, etc. defined by the surgical plan. The haptic objects can be oriented and positioned in three-dimensional space relative to a tracked position of a patient's anatomy.

At step 306, a pose of a surgical device is tracked relative to the haptic object(s), for example by the tracking system 222 described above. In some embodiments, one point on the surgical device is tracked. In other embodiments, (e.g., in the example of FIGS. 4-5) two points on the surgical device are tracked, for example a tool center point (TCP) at a tip/effective end of the surgical device and a second interaction point (SIP) positioned along a body or handle portion of the surgical device. In other embodiments, three or more points on the surgical device are tracked. A pose of the surgical device is ascertained relative to a coordinate system in which the one or more haptic objects are defined and, in some embodiments, in which the pose of one or more anatomical features of the patient is also tracked.

At step 308, the surgical device is guided to the haptic object(s). For example, the display 264 of the surgical system 200 may display a graphical user interface instructing a user on how (e.g., which direction) to move the surgical device and/or robotic device to bring the surgical device to a haptic object. As another example, the surgical device may be guided to a haptic object using a collapsing haptic boundary as described in U.S. Pat. No. 9,289,264, the entire disclosure of which is incorporated by reference herein. As another example, the robotic device may be controlled to automatically move the surgical device to a haptic object.

In an embodiment where the robotic device is controlled to automatically move the surgical device to the haptic object (referred to as motorized alignment or automated alignment), the robotic device may be controlled so that a duration of the alignment is bounded by preset upper and lower time thresholds. That is, across various instances of process 300 and multiple procedures, automated alignment in step 308 may be configured to always take between a first amount of time (the lower time threshold) and a second amount of time (the upper time threshold). The lower time threshold may be selected such that the robotic device moves over a long enough duration to be perceived as well-controlled and to minimize collision or other risks associated with high speed. The upper time threshold may be selected such that the robotic device moves over a short enough duration to avoid user impatience and provide improved usability. For example, the upper time threshold hold may be approximately five seconds in an example where the lower time thresholds is approximately three seconds. In other embodiments, a single duration setpoint is used (e.g., four seconds). Step 308 can include optimizing a path for the robotic device such that the step 308 ensures successful alignment to the haptic object while also satisfying the upper and lower time thresholds or duration setpoint.

At step 310, the robotic device is controlled to constrain movement of the surgical device based on the tracked pose of the surgical device and the poses of one or more haptic objects. The constraining of the surgical device may be achieved as described above with reference to FIG. 2.

At step 312, exit of the surgical device from the haptic object(s) is facilitated, e.g., to release the constraints of a haptic object. For example, in some embodiments, the robotic device is controlled to allow the surgical device to exit a haptic object along an axis of the haptic object. In some embodiments, the surgical device may be allowed to exit the haptic object in a pre-determined direction relative to the haptic object. The surgical device may thereby be removed from the surgical field and the haptic object to facilitate subsequent steps of the surgical procedure. Additionally, it should be understood that, in some cases, the process 300 may return to step 308 where the surgical device is guided to the same or different haptic object after exiting a haptic object at step 312.

Process 300 may thereby be executed by the surgical system 200 to facilitate a surgical procedure. Features of process 300 are shown in FIGS. 4-8 below according to some embodiments, and such features can be combined in various combinations in various embodiments and/or based on settings selected for a particular procedure. Furthermore, it should be understood that the features of FIGS. 4-8 may be provided while omitting some or all other steps of process 300. All such possibilities are within the scope of the present disclosure.

Figure 4:
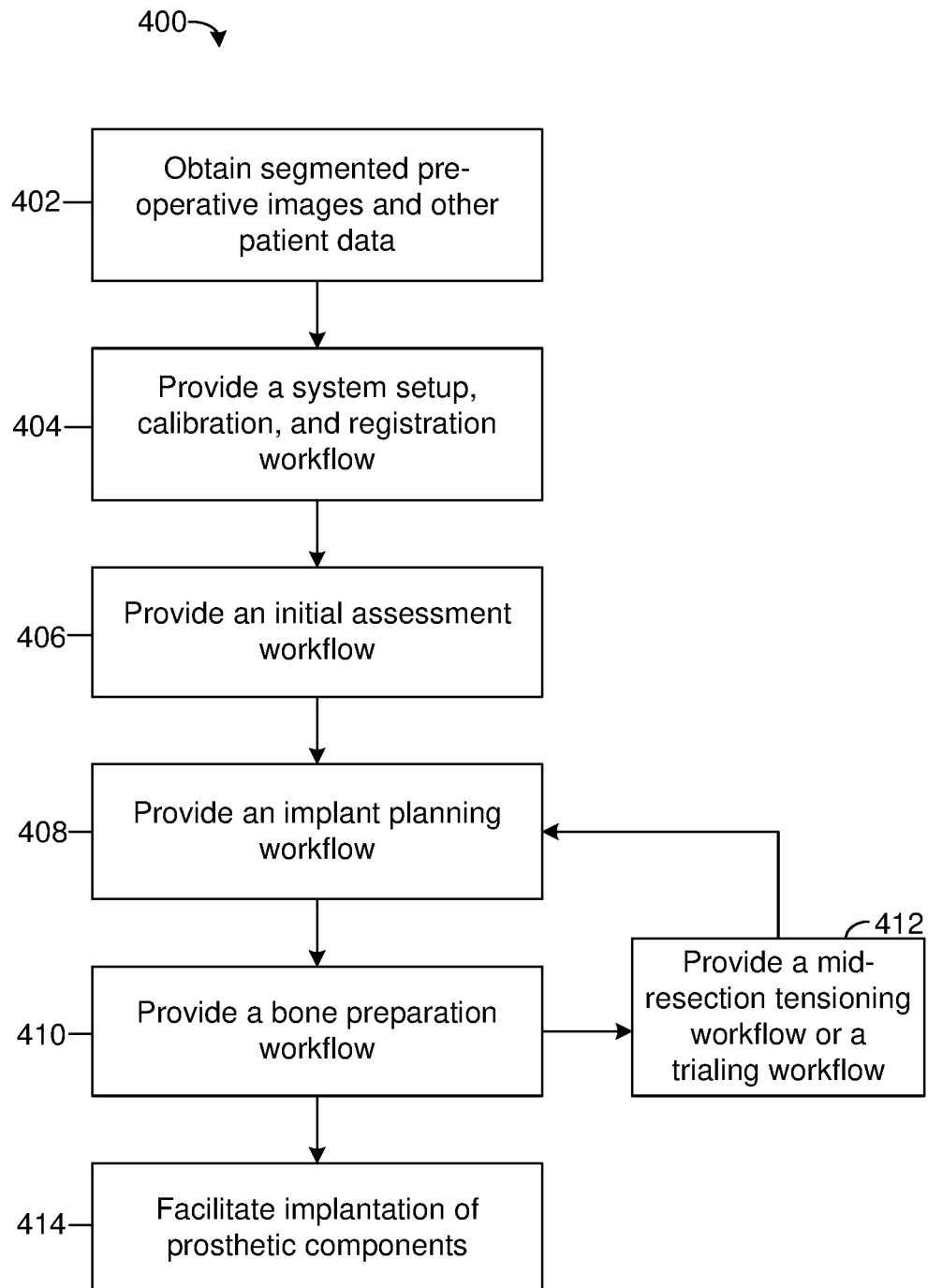
FIG. 4 is a flowchart of a second process that can be executed by the surgical system of FIG. 2, according to an exemplary embodiment.

Referring now to FIG. 4, a flowchart of a process 400 for facilitating surgical planning and guidance is shown, according to an exemplary embodiment. The process 400 may be executed by the surgical system 200 of FIG. 2, in some embodiments. In some cases, the process 300 is executed as part of executing the process 400.

At step 402, segmented pre-operative images and other patient data are obtained, for example by the surgical system 200. For example, segmented pre-operative CT images or MM images may be received at the computing system 224 from an external server. In some cases, pre-operative images of a patient's anatomy are collected using an imaging device and segmented by a separate computing system and/or with manual user input to facilitate segmentation. In other embodiments, unsegmented pre-operative images are received at the computing system 224 and the computing system 224 is configured to automatically segment the images. The segmented pre-operative images can show the geometry, shape, size, density, and/or other characteristics of bones of a joint which is to be operated on in a procedure performed using process 400.

Other patient data can also be obtained at step 402. For example, the computing system 224 may receive patient information from an electronic medical records system. As another example, the computing system 224 may accept user input of patient information. The other patient data may include a patient's name, identification number, biographical information (e.g., age, weight, etc.), other health conditions, etc. In some embodiments, the patient data obtained at step 402 includes information specific to the procedure to be performed and the relevant pre-operative diagnosis. For example, the patient data may indicate which joint the procedure will be performed on (e.g., right knee, left knee). The patient data may indicate a diagnosed deformity, for example indicating whether a knee joint was diagnosed as having a varus deformity or a valgus deformity. This or other data that may facilitate the surgical procedure may be obtained at step 402.

At step 404, a system setup, calibration, and registration workflow is provided, for example by the surgical system 200. The system setup, calibration, and registration workflows may be configured to prepare the surgical system 200 for use in facilitating a surgical procedure. For example, at step 404, the computing system 224 may operate to provide graphical user interfaces that include instructions for performing system setup, calibration, and registrations steps. The computing system 224 may also cause the tracking system 222 to collect tracking data and control the robotic device 220 to facilitate system setup, calibration, and/or registration. The computing system 224 may also receiving tracking data from the tracking system 222 and information from the computing system 224 and use the received information and data to calibrate the robotic device 220 and define various geometric relationships between tracked points (e.g., fiducials, markers), other components of the surgical system 200 (e.g., robotic arm 232, surgical device 234, probe), and virtual representations of anatomical features (e.g., virtual bone models).

The system setup workflow provided at step 404 may include guiding the robotic device 220 to a position relative to a surgical table and the patient which will be suitable for completing an entire surgical procedure without repositioning the robotic device 220. For example, the computing system 224 may generate and provide a graphical user interface configured to provide instructions for moving a portable cart of the robotic device 220 into a preferred position. In some embodiments, the robotic device 220 can be tracked to determine whether the robotic device 220 is properly positioned. Once the cart is positioned, in some embodiments the robotic device 220 is controlled to automatically position the robotic arm 232 in a pose suitable for initiation of calibration and/or registration workflows.

The calibration and registration workflows provided at step 404 may include generating instructions for a user to perform various calibration and registration tasks while operating the tracking system 222 to generate tracking data. The tracking data can then be used to calibrate the tracking system 222 and the robotic device 220 and to register the first fiducial tree 240, second fiducial tree 241, and third fiducial tree 242 relative to the patient's anatomical features, for example by defining geometric relationships between the fiducial trees 240-242 and relevant bones of the patient in the example of FIG. 2. The registration workflow may include tracking a probe used to touch various points on the bones of a joint. In some embodiments, providing the registration workflow may include providing instructions to couple a checkpoint (e.g., a screw or pin configured to be contacted by a probe) to a bone and tracking a probe as the probe contacts the checkpoint and as the probe is used to paint (e.g., move along, touch many points along) one or more surfaces of the bone. The probe can be moved and tracked in order to collect points in or proximate the joint to be operated upon as well as at other points on the bone (e.g., at ankle or hip for a knee surgery).

In some embodiments, providing the registration workflow includes generating instructions to move the patient's leg to facilitate collection of relevant tracking data that can be used to identify the location of a biomechanical feature, for example a hip center point. Providing the registration workflow can include providing audio or visual feedback indicating whether the leg was moved in the proper manner to collect sufficient tracking data. Various methods and approaches for registration and calibration can be used in various embodiments. Step 404 may include steps performed before or after an initial surgical incision is made in the patient's skin to initiate the surgical procedure.

At step 406, an initial assessment workflow is provided, for example by the surgical system 200. The initial assessment workflow provides an initial assessment of the joint to be operated upon based on tracked poses of the bones of the joint. For example, the initial assessment workflow may include tracking relative positions of a tibia and a femur using data from the tracking system while providing real-time visualizations of the tibia and femur via a graphical user interface. The computing system 224 may provide instructions via the graphical user interface to move the tibia and femur to different relative positions (e.g., different degrees of flexion) and to exert different forces on the joint (e.g., a varus or valgus force). In some embodiments, the initial assessment workflow includes determine, by the surgical system 200 and based on data from the tracking system 222, whether the patient's joint has a varus or valgus deformity, and, in some embodiments, determining a magnitude of the deformity. In some embodiments, the initial assessment workflow may include collecting data relating to native ligament tension or native gaps between bones of the joint. In some embodiments, the initial assessment workflow may include displaying instructions to exert a force on the patient's leg to place the joint in a corrected state corresponding to a desired outcome for a joint arthroplasty procedure, and recording the relative poses of the bones and other relevant measurements while the joint is in the corrected state. The initial assessment workflow thereby results in collection of data that may be useful for the surgical system 200 or a surgeon in later steps of process 400.

At step 408, an implant planning workflow is provided, for example by the surgical system 200. The implant planning workflow is configured to facilitate users in planning implant placement relative to the patient's bones and/or planning bone cuts or other modifications for preparing bones to receive implant components. Step 408 may include generating, for example by the computing system 224, three-dimensional computer models of the bones of the joint (e.g., a tibia model and a femur model) based on the segmented medical images received at step 402. Step 408 may also include obtaining three-dimensional computer models of prosthetic components to be implanted at the joint (e.g., a tibial implant model and a femoral implant model). A graphical user interface can be generated showing multiple views of the three-dimensional bone models with the three-dimensional implant models shown in planned positions relative to the three-dimensional bone models. Providing the implant planning workflow can include enabling the user to adjust the position and orientation of the implant models relative to the bone models. Planned cuts for preparing the bones to allow the implants to be implanted at the planned positions can then be automatically based on the positioning of the implant models relative to the bone models.

The graphical user interface can include data and measurements from pre-operative patient data (e.g., from step 402) and from the initial assessment workflow (step 406) and/or related measurements that would result from the planned implant placement. The planned measurements (e.g., planned gaps, planned varus/valgus angles, etc.) can be calculated based in part on data collected via the tracking system 222 in other phases of process 400, for example from initial assessment in step 406 or trialing or tensioning workflows described below with reference to step 412.

The implant planning workflow may also include providing warnings (alerts, notifications) to users when an implant plan violates various criteria. In some cases, the criteria can be predefined, for example related to regulatory or system requirements that are constant for all surgeons and/or for all patients. In other embodiments, the criteria may be related to surgeon preferences, such that the criteria for triggering a warning can be different for different surgeons. In some cases, the computing system 224 can prevent the process 400 from moving out of the implant planning workflow when one or more of certain criteria are not met.

The implant planning workflow provided at step 408 thereby results in planned cuts for preparing a joint to receive prosthetic implant components. In some embodiments, the planned cuts include a planar tibial cut and multiple planar femoral cuts, for example as described above with reference to FIG. 1. The planned cuts can be defined relative to the virtual bone models used in the implant planning workflow at step 408. Based on registration processes from step 404 which define a relationship between tracked fiducial markers and the virtual bone models, the positions and orientations of the planned cuts can also be defined relative to the tracked fiducial markers, (e.g., in a coordinate system used by the tracking system 222). The surgical system 200 is thereby configured to associate the planned cuts output from step 408 with corresponding planes or other geometries in real space.

At step 410, a bone preparation workflow is provided, for example by the surgical system 200. The bone preparation workflow includes guiding execution of one or more cuts or other bone modifications based on the surgical plan created at step 408. For example, as explained in detail above with reference to FIGS. 2-3, the bone preparation workflow may include providing haptic feedback which constrains the surgical device 234 to a plane associated with a planned cut to facilitate use of the surgical device 234 to make that planned cut. In other embodiments, the bone preparation workflow can include automatically controlling the robotic device 220 to autonomously make one or more cuts or other bone modifications to carry out the surgical plan created at step 408. In other embodiments, the bone preparation workflow comprises causing the robotic device 220 to hold a cutting guide, drill guide, jig, etc. in a substantially fixed position that allows a separate surgical device to be used to execute the planned cut while being confined by the cutting guide, drill guide, jig, etc. The bone preparation workflow can thus include control of a robotic device in accordance with the surgical plan.

The bone preparation workflow at step 410 can also include displaying graphical user interface elements configured to guide a surgeon in completing one or more planned cuts. For example, the bone preparation workflow can include tracking the position of a surgical device relative to a plane or other geometry associated with a planned cut and relative to the bone to be cut. In this example, the bone preparation workflow can include displaying, in real-time, the relative positions of the surgical device, cut plane or other geometry, and bone model. In some embodiments, visual, audio, or haptic warnings can be provided to indicate completion or start of an event or step of the procedure, entry or exit from a state or virtual object, interruptions to performance of the planned cut, deviation from the planned cut, or violation of other criteria relating to the bone preparation workflow.

In some embodiments, step 410 is provided until all bone cuts planned at step 408 are complete and the bones are ready to be coupled to the implant components. In other embodiments, for example as shown in FIG. 4, a first iteration of step 410 can include performing only a portion of the planned cuts. For example, in a total knee arthroplasty procedure, a first iteration of step 410 can include making a tibial cut to provide a planar surface on the tibia without modifying the femur in the first iteration of step 410.

Following an iteration of the bone preparation workflow at step 410, the process 400 can proceed to step 412. At step 412 a mid-resection tensioning workflow or a trialing workflow is provided, for example by the surgical system 200. The mid-resection tensioning workflow is provided when less than all of the bone resection has been completed. The trialing workflow is provided when all resections have been made and/or bones are otherwise prepared to be temporarily coupled to trial implants. The mid-resection tensioning workflow and the trialing workflow at step 412 provide for collection of intraoperative data relating to relative positions of bones of the joint using the tracking system 222 including performing gap measurements or other tensioning procedures that can facilitate soft tissue balancing and/or adjustments to the surgical plan.

For example, step 412 may include displaying instructions to a user to move the joint through a range of motion, for example from flexion to extension, while the tracking system 222 tracks the bones. In some embodiments, gap distances between bones are determined from data collected by the tracking system 222 as a surgeon places the joint in both flexion and extension. In some embodiments, soft tissue tension or distraction forces are measured. Because one or more bone resections have been made before step 412 and soft tissue has been affected by the procedure, the mechanics of the joint may be different than during the initial assessment workflow of step 402 and relative to when the pre-operative imaging was performed.

Accordingly, providing for intra-operative measurements in step 412 can provide information to a surgeon and to the surgical system 200 that was not available pre-operatively and which can be used to help fine tune the surgical plan.

From step 412, the process 400 returns to step 408 to provide the implant planning workflow again, now augmented with data collected during a mid-resection or trialing workflow at step 412. For example, planned gaps between implants can be calculated based on the intraoperative measurements collected at step 414, the planned position of a tibial implant relative to a tibia, and the planned position of a femoral implant relative to a femur. The planned gap values can then be displayed in an implant planning interface during step 408 to allow a surgeon to adjust the planned implant positions based on the calculated gap values. In various embodiments, a second iteration of step 408 to provide the implant planning workflow incorporates various data from step 412 in order to facilitate a surgeon in modifying and fine-tuning the surgical plan intraoperatively.

Steps 408, 410, and 412 can be performed multiple times to provide for intra-operative updates to the surgical plan based on intraoperative measurements collected between bone resections. For example, in some cases, a first iteration of steps 408, 410, and 412 includes planning a tibial cut in step 408, executing the planned tibial cut in step 410, and providing a mid-resection tensioning workflow in step 414. In this example, a second iteration of steps 408, 410, and 412 can include planning femoral cuts using data collected in the mid-resection tensioning workflow in step 408, executing the femoral cuts in step 410, and providing a trialing workflow in step 412. Providing the trialing workflow can include displaying instructions relating to placing trial implants on the prepared bone surfaces, and, in some embodiments, verifying that the trial implants are positioned in planned positions using the tracking system 222. Tracking data can be collected in a trialing workflow in step 412 relating to whether the trial implants are placed in acceptable positions or whether further adjustments to the surgical plan are needed by cycling back to step 408 and making further bone modifications in another iteration of step 410.

In some embodiments, executing process 400 can include providing users with options to jump between steps of the process 400 to enter a desired workflow. For example, a user can be allowed to switch between implant planning and bone preparation on demand. In other embodiments, executing process 400 can include ensuring that a particular sequence of steps of process 400 are followed. In various embodiments, any number of iterations of the various steps can be performed until a surgeon is satisfied that the bones have been properly prepared to receive implant components in clinically-appropriate positions.

As shown in FIG. 4, the process 400 includes step 414 where implantation of prosthetic components is facilitated. Once the bones have been prepared via step 410, the prosthetic components can be implanted. In some embodiments, step 414 is executed by the surgical system 200 by removing the robotic arm 232 from the surgical field and otherwise getting out of the way to allow a surgeon to fix the prosthetic components onto the bones without further assistance from the surgical system 200. In some embodiments, step 414 includes displaying instructions and/or navigational information that supports a surgeon in placing prosthetic components in the planned positions. In yet other embodiments, step 414 includes controlling the robotic arm 232 to place one or more prosthetic components in planned positions (e.g., holding a prosthetic component in the planned position while cement cures, while screws are inserted, constraining an impaction device to planned trajectory). Process 400 can thereby result in prosthetic components being affixed to modified bones according to an intra-operatively updated surgical plan.

Figure 5:
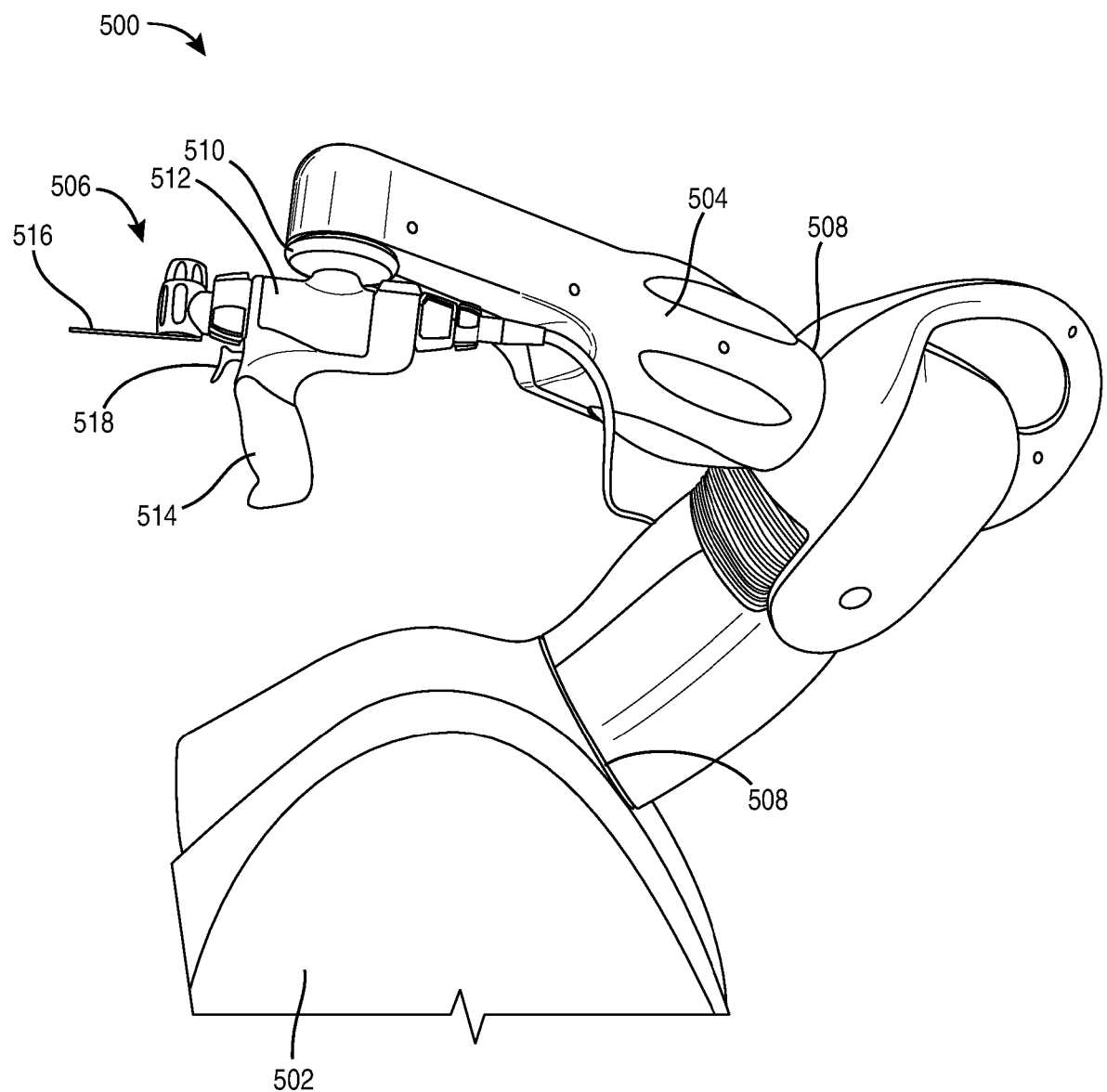
FIG. 5 is an illustration of a robotic device, according to an exemplary embodiment.

Referring now to FIG. 5, a robotic device 500 is shown, according to an exemplary embodiment. In general, the robotic device 500 is configured to modify a patient's anatomy (e.g., femur, tibia, etc.). Robotic device 500 may be an exemplary embodiment of the robotic device 220 as shown in FIG. 2, and may be part of surgical system 200 as shown in FIG. 2. The robotic device 500 includes a base 502, a robotic arm 504, and a surgical device 506. The robotic device 500 may be communicably coupled to a tracking system and a computing system (e.g., tracking system 222 and computing system 224).

The base 502 provides a moveable foundation for robotic arm 504, allowing the robotic arm 504 and the surgical device 506 to be positioned and repositioned as needed relative to a patient. The base 502 may also contain power systems, computing elements, motors, and other electronic or mechanical systems necessary for the functions of the robotic arm 504 and the surgical device 506 described below.

As described above in reference to the robotic device 220 in FIG. 2, the robotic arm 504 is configured to support the surgical device 506 and provide a force as instructed by a computing system (e.g., computing system 224). In some embodiments, the robotic arm 504 allows a user to manipulate the surgical device 506 and provides force feedback to the user. In such an embodiment, the robotic arm 504 includes joints 508 and a mount 510 that includes motors, actuators, or other mechanisms configured to allow a user to freely translate and rotate the robotic arm 504 and surgical device 506 through allowable poses while providing feedback to constrain or prevent some movements of the robotic arm 504 and surgical device 506 as instructed by the computing system 224. In some embodiments, the robotic arm 504 is configured to move the surgical device 506 to a new pose automatically, without direct user manipulation, as instructed by computing system 224 in order to position the robotic arm 504 as desired and/or to complete certain surgical tasks, including modifications to a patient's anatomy (e.g., femur, tibia, etc.).

In some embodiments, the surgical device 506 is configured to cut, burr, grind, drill, partially resect, reshape, and/or otherwise modify a bone. The surgical device 506 may also include a holding arm or other support configured to hold an implant (e.g., cup 28a, implant augment, etc.), or an impaction tool configured to provide impaction force to a cup implant. The surgical device 506 may also be, or include, any suitable cutting tool (e.g., a drill with a rotary bit, a drill with a spherical burr, a sagittal saw, a sagittal saw blade, a laser cutting device, etc.), and may be, or include, one of multiple tools interchangeably connected to the robotic device 500. For example, as shown in FIG. 5 the surgical device 506 may be a sagittal saw, comprising a housing 512, a handle 514, a sagittal saw blade 516, and a trigger mechanism 518. The housing 512 may be interchangeably connected to mount 510, and may be configured to support the handle 514, sagittal saw blade 516, and trigger mechanism 518. The housing 512 may also contain power systems, computing elements, motors, and other electronic or mechanical systems necessary for the functions of the surgical device 506. The handle 514 may extend from housing 512, and may be configured to allow the user to manipulate the surgical device 506. The handle 514 may be made of any material suitable for cleaning or sterilization. The sagittal saw blade 516 may be interchangeably connected to the housing 512, and may be aligned parallel with the housing 512, or perpendicular to the housing 512 axis. Trigger mechanism 518 may be connected to the housing 512, and can be configured to be pressed (depressed), released, held in place, double-pressed (e.g., pressed, released, and then pressed again in quick succession (e.g., within one second)), or any combination thereof. The trigger mechanism 518 may also be made of any material suitable for cleaning or sterilization, and may interact with the electronic or mechanical systems necessary for the functions of the surgical device 506 located in the housing 512.

Figure 6:
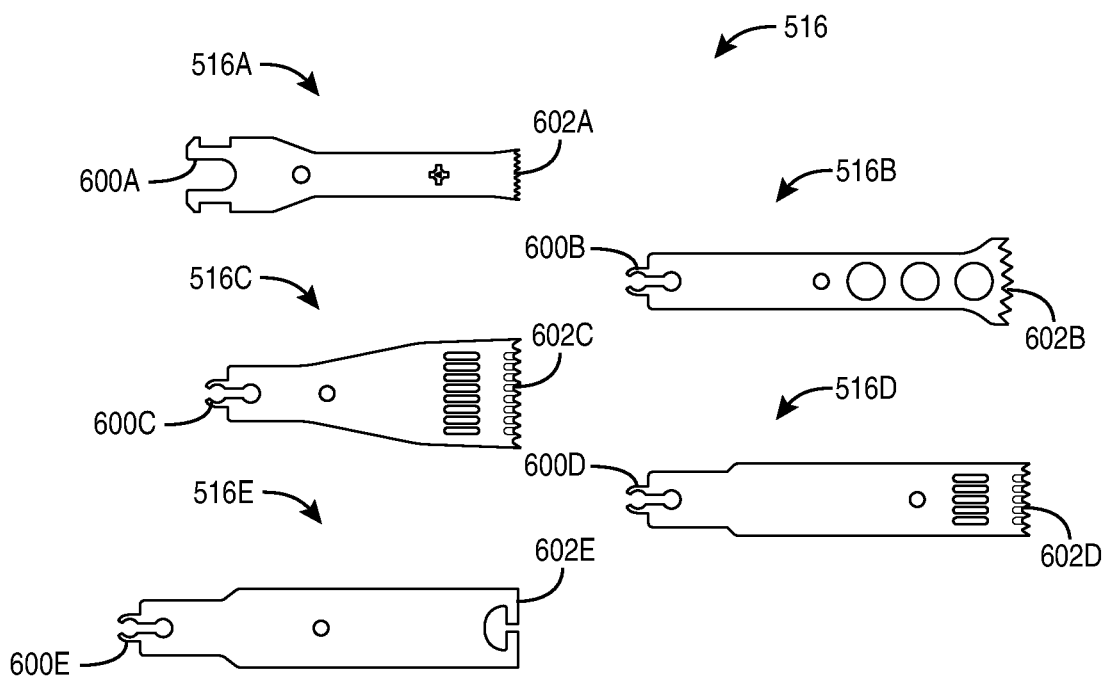
FIG. 6 is an illustration of a plurality of sagittal saw blades, according to an exemplary embodiment.

Referring now to FIG. 6, an illustration of a first sagittal saw blade 516A, a second sagittal saw blade 516B, a third sagittal saw blade 516C, a fourth sagittal saw blade 516D, and a fifth sagittal saw blade 516E are shown, according to an exemplary embodiment. Each sagittal saw blade 516A-

516E may be configured to oscillate relative to an axis, such that sagittal saw blades 516A-516E may cut, burr, grind, reshape, and/or otherwise modify a bone of a patient. In addition, each sagittal saw blade 516A-516E may be interchangeable exemplary embodiments of the sagittal saw blade 516 as shown in FIG. 5. Each sagittal saw blade 516A-516E may be interchangeably used for different surgical plans, steps of a surgical procedure, planned cuts, scenarios, etc. Each sagittal saw blade 516A-516E may comprise a connection end 600 (e.g., as illustrated by connection ends 600A-600E), a cut end 602 (e.g., as illustrated by cut ends 602A-602E), and a predefined point 604 (shown as points 604A-E) on body between the connection end 600 and the cut end 602. Connection end 600 may be configured to interchangeably connect with the housing 512 of the surgical device 506, and may interact with the electronic or mechanical systems in housing 512. Furthermore, cut end 602 may be configured to oscillate so as to cut, burr, grind, reshape, and/or otherwise modify a bone of a patient. Predefined point 604 may be located at any point along the sagittal saw blade 516, and is configured to be contacted by, and interact with, a probe. The sagittal saw blade 516 may be made of any suitable material for cutting (e.g., stainless steel), and may come in a variety of shapes, sizes, and thicknesses. For example, the first sagittal saw blade 516A may comprise a larger connection end 600A and a smaller (e.g., narrower) cut end 602A, compared to connection end 600B and cut end 602B of the second sagittal saw blade 516B. The second sagittal saw blade 516B may comprise a connection end 600B that is similar in shape and size to the connection end 600C of the third sagittal saw blade 516C; however, the second sagittal saw blade 516B may comprise a smaller (e.g., narrower) cut end 602B compared to cut end 602C of the third sagittal saw blade 516C. Similarly, the fourth sagittal saw blade 516D may comprise a connection end 600D that is similar in shape and size to the connection end 600E of the fifth sagittal saw blade 516E; however, the fifth sagittal saw blade 516E may comprise a cut end 602E that comprises a gap or groove. For example, the blades 516A-E can be suitable for performing a wide variety of bone preparations depending on which blade 516A-E is used.

Figure 7:
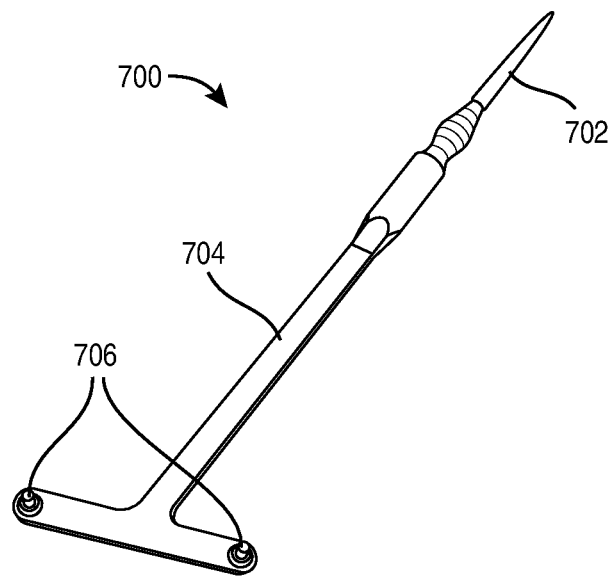
FIG. 7 is an illustration of a probe, according to an exemplary embodiment.

Referring now to FIG. 7, an illustration of a probe 700 is shown, according to an exemplary embodiment. The probe 700 is configured to interact with tracking system 222 and computing system 224 to aide in defining various geometric relationships between points (e.g., fiducials, markers, etc.), components of surgical system 200 (e.g., robotic device 220, robotic device 500, surgical device 506, sagittal saw blade 516, etc.), and virtual representations of anatomical features (e.g., virtual bone models). The probe 700 may comprise a probe point 702, a handle 704, and a plurality of tracking reflectors 706 (markers, fiducials, etc.). The probe point 702 may be used to touch points on a bone, joint, tool, instrument (e.g., the predefined point 604 of sagittal saw blade 516), or other checkpoint relevant to the surgical system 200. The probe point 702 may also be used to paint (e.g., move along, touch many points along) one or more surfaces of a bone, other tissue, or boundary of other geometry. Handle 704 is situated between probe point 702 and the plurality of tracking reflectors 706, and is configured to permit a user to hold, manipulate, and/or position probe 700. The plurality of tracking reflectors 706 extend from handle 704, and are configured to interact with (e.g., be visible to as described above) the tracking system 222 of surgical system 200, so that the probe 700 can be tracked by the tracking system 222. In some embodiments, the probe 700 may be any suitable calibrated tracker (i.e. an end effector array, a bone array (e.g., fiducial trees 240, 242), or any other suitable calibrated tracker).

Figure 8:
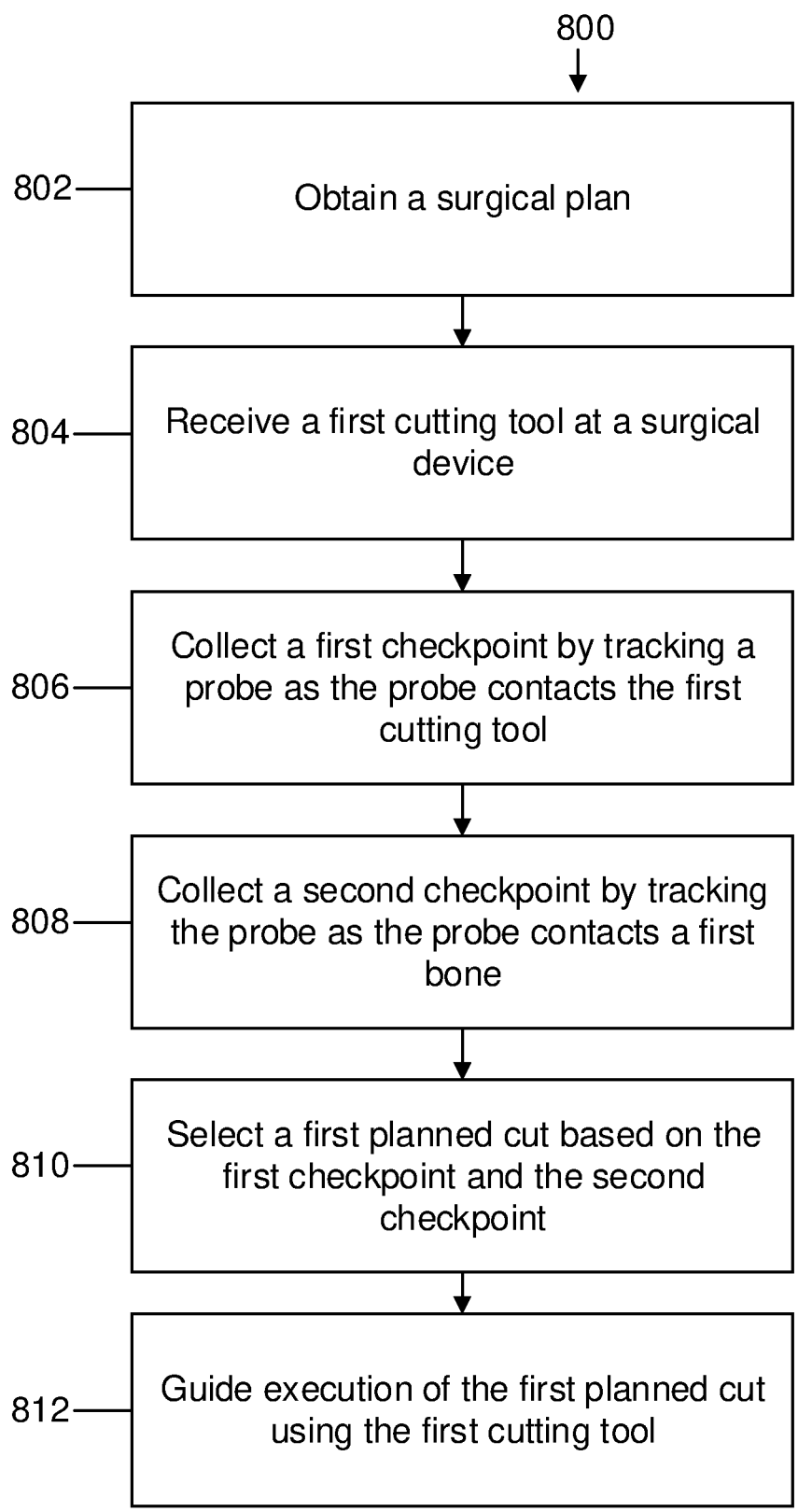
FIG. 8 is a flowchart of an example process for selecting a cut as part of the process of FIG. 4, according to an exemplary embodiment.

Referring now to FIG. 8, a flowchart of a process 800 for executing a selected cut is shown, according to an exemplary embodiment. The process 800 can be executed by the robotic device 500 of FIG. 5, for example. The process 800 can be implemented as part of the bone preparation workflow of step 410 of FIG. 4.

At step 802, a surgical plan is obtained. The surgical plan (e.g., a computer-readable data file) may define a desired outcome of bone modifications, for example defined based on a desired position of prosthetic components relative to the patient's anatomy. For example, in the case of a knee arthroplasty procedure, the surgical plan may provide planned positions and orientations of one or more of the planar surfaces 102-110 and/or the pilot holes 120 as show in FIG. 1. The surgical plan may be generated based on medical imaging, 3D modeling, surgeon input, etc. The display 264 of the surgical system 200 may also display a graphical user interface displaying the surgical plan.

At step 804, a first cutting tool is received at a surgical device. As discussed above with regard to FIG. 5, the surgical device 506 may be, or include, any suitable cutting tool (e.g., a drill with a rotary bit, a drill with a spherical burr, a sagittal saw, a sagittal saw blade, a laser cutting device, etc.), and may be, or include, one of multiple tools interchangeably connected to the robotic device 500. For the sake of example, a first sagittal saw blade 516A may be received in step 804 as the primary example, although any suitable cutting tool (e.g., any of sagittal saw blades 516A-516E) may be received in various instances of step 804. At step 804, the robotic device 500 may receive the first sagittal saw blade 516A at the surgical device 506. The first sagittal saw blade 516A may be received at a slot, recess, clip, protrusion, etc. of the surgical device 506, which may be configured to receive and selectively retain the first sagittal saw blade 516A at the surgical device 506. The first sagittal saw blade 516A may thereby be connected and arranged such that the first sagittal saw blade 516A is ready for use in executing a cut of a bone or other tissue. The first sagittal saw blade 516A may be selected from a plurality of cutting tools (e.g., a plurality of sagittal saw blades 516A-516E as shown in FIG. 6). In some embodiments, in response to the surgical device 506 receiving the first sagittal saw blade 516A, the power systems, computing elements, motors, and/or other electronic or mechanical systems of the surgical device 506, or robotic device 500, may automatically operate to confirm that the first sagittal saw blade 516A has been properly received at the surgical device 506, or to detect an improper or incomplete connection between the first sagittal saw blade 516A and the surgical device 506. Such information may be relayed to the computing system 224, and displayed on a graphical user interface of display 264. For example, the display 264 may show a graphical user interface that indicates when the sagittal saw blade 516 is not correctly received by the surgical device 506 or robotic device 500. In some embodiments, the surgical device 506 may automatically detect which of the plurality of cutting tools (e.g., the plurality of sagittal saw blades 516A-516E) has been received, for example by reading information encoded on the cutting tool (e.g., RFID).

At step 806, a first checkpoint is collected. The first checkpoint may be collected from any suitable cutting tool (e.g., a drill with a rotary bit, a drill with a spherical burr, a sagittal saw, a sagittal saw blade, etc.), at a bone, or at any other suitable checkpoint location, as discussed below. For the sake of example, the first checkpoint may be collected from the cutting tool (e.g. the sagittal saw blade 516A) received in step 804. The surgical system 200 may collect the first checkpoint by tracking probe 700, or any other suitable tracking tool discussed above, as the probe 700 contacts the first sagittal saw blade 516A at predefined point 604. The tracking system 222 of surgical system 200 may be used to track probe 700 in response to user input, for example manipulation of the probe 700 at or near the predefined point 604 of the first sagittal saw blade 516A. The tracking system 222 may relay tracking data to the computing system 224 of the surgical system 200. The user may indicate that the probe 700 is at the predefined point 604 of the first sagittal saw blade 516A by providing a user input (e.g., pressing a foot pedal, a button on the probe 700, a button on the robotic device 500, the trigger mechanism 518 of the surgical device 506, providing a voice command, etc.). In some embodiments, the tracking system 222 and the computing system 224 may automatically detect the probe 700 is at the predefined point 604 of the first sagittal saw blade 516A when the probe 700 comes into contact with the first sagittal saw blade 516A at the predefined point 604. In other embodiments, the computing system 224 may automatically determine and/or update which of the plurality of cutting tools has been selected based on the first checkpoint (e.g., via tracking system 222 and the location of the predefined point 604, the location of the first checkpoint, the offset of the first checkpoint from an axis, etc.). Further, in yet other embodiments, the computing system 224 may automatically determine and/or update a planned cut based on which of the plurality of cutting tools has been determined to have been selected (e.g., based on the first checkpoint).

Once probe 700 is at the predefined point 604 on the first sagittal saw blade 516A, the first checkpoint may be collected via tracking system 222 and stored in the computing system 224. A graphical user interface may be provided via the display of 264 of the surgical system 200. The graphical user interface may be updated in real-time to show the position of probe 700 relative to the first sagittal saw blade 516A and the predefined point 604. Once probe 700 is at the predefined point 604 on the first sagittal saw blade 516A, the graphical user interface may indicate that the first checkpoint has been collected. The graphical user interface may also provide instructions for positioning the probe 700 relative to the predefined point 604. Because the first checkpoint is specific to the first sagittal saw blade 516A, collection of the first checkpoint provides data indicative of which of the plurality of sagittal saw blades was received at step 804, as well as, which of the plurality of planned cuts may be suitable for the cutting tool that was selected, as discussed below.

At step 808, a second checkpoint is collected. The second checkpoint may also be collected from any suitable cutting tool, at a bone, or at any other suitable checkpoint location, as discussed below. For the sake of example, the second checkpoint may be collected from a first bone of a joint. As such, the surgical system 200 may collect the second checkpoint by tracking the probe 700, or any other suitable tracking tool as discussed above, as the probe 700 contacts the first bone or a pin, screw, divot, etc. installed on the first bone (see, e.g., FIG. 9 discussed below). Like step 806, tracking system 222 may be used to track the probe 700 in response to user input, for example manipulation of the probe 700 near the first bone. The tracking system 222 may relay tracking data to the computing system 224. In some embodiments, the user may indicate that the probe 700 is at a predefined point at the first bone by providing a user input (e.g., pressing a foot pedal, a button on the probe 700, a button on the robotic device 500, the trigger mechanism 518 of the surgical device 506, providing a voice command, etc.). In some embodiments, the tracking system 222 and computing system 224 may automatically detect the probe 700 is at the predefined point at the first bone when the probe 700 couples with the predefined point at the first bone (e.g., a pin, screw, etc.). In some embodiments, the predefined point at the first bone may be a second predefined point at the first bone, which may correspond with the second checkpoint. The predefined point at the first bone may also be any landmark suitable for tracking (e.g., anatomical structure at the bone, and/or a pin, screw, divot, etc. configured to be contacted by probe 700, etc.).

Once the probe 700 is at the predefined point at the first bone, the second checkpoint may be collected via tracking system 222 and stored in computing system 224. A graphical user interface may be provided via the display of 264, and the graphical user interface may be updated in real-time to show the position of the probe 700 relative to the predefined point at the first bone. Once probe 700 is positioned at the predefined point at the first bone, the graphical user interface may indicate that the second checkpoint has been collected. The graphical user interface may also provide instructions for positioning the probe 700 relative to the predefined point at the first bone. The second checkpoint may be indicative of which of multiple bones of the joint is being selected by the user. Collection of the second checkpoint may also be used to confirm and validate registration and calibration of the tracking system 222. It should be understood that although the embodiments discussed in steps 804-808 indicate that the first checkpoint may be collected from the cutting tool (e.g., the first sagittal saw blade 516A), and the second checkpoint may be collected from the first bone of the joint, the first checkpoint may be collected at any bone or any other suitable location, and the second checkpoint may be collected at the cutting tool or any other suitable location. The examples discussed in steps 804-808 above are not intended to be limiting.

At step 810, a first planned cut is selected from a plurality of planned cuts based on the first checkpoint and the second checkpoint. For example, the surgical system 200 may automatically select the first planned cut based on the first checkpoint and the second checkpoint data collected via tracking system 222 and computing system 224. The computing system 224 and/or processing circuit 260 of the surgical system 200 may select the first planned cut from the plurality of planned cuts determined during an implant planning workflow, for example during step 408 of FIG. 4. For example, a look-up table or rules-based algorithm that maps a combination of the first checkpoint and the second checkpoint to a planned cut, such that different combinations of checkpoints correspond to different cuts. For the sake of example, step 810 can include determining which of the plurality of cutting tools (e.g., plurality of sagittal saw blades 516A-516E) is in use based on the first checkpoint (or the second checkpoint), determining which first bone is selected based on the second checkpoint (or the first checkpoint), and then use a stored table or set of rules to select a planned cut of the selected (i.e. first) bone based on which cut(s) are compatible with the particular cutting tool (e.g., the sagittal saw blade 516) received at step 804-806. A suitable cut can thus be automatically selected based on the first checkpoint and the second checkpoint collected in steps 806 and 808. A graphical user interface may be provided via the display of 264, and the graphical user interface may provide a three-dimensional representation of a bone model (e.g., virtual bone model) and the selected, first planned cut.

At step 812, robotic device 500 guides the first planned cut. For example, step 812 may be implemented as described above for steps 306-312 of FIG. 3. For example, the robotic device 500 may control the robotic arm 504 and the surgical device 506 to situate the first sagittal saw blade 516A in position for the first planned cut. In some embodiments, the robotic device 500 may control the surgical device 506, and in response to a user input (e.g., pressing a foot pedal, a button on the probe 700, a button on the robotic device 500, the trigger mechanism 518 of the surgical device 506, providing a voice command, etc.) align the cutting tool (e.g., the first sagittal saw blade 516A) with the first planned cut. In an exemplary embodiment, the robotic device 500 may control the surgical device 506 and the first sagittal saw blade 516A to guide the user through execution of the first planned cut. Robotic device 500 may also be configured to automatically control or move the surgical device 506 and the first sagittal saw blade 516A into position for, and throughout execution of, the first planned cut. A graphical user interface may also be provided via the display of 264, and the graphical user interface can be configured to guide the user in executing the first planned cut.

In some embodiments, following execution of step 812, steps 810-812 may be repeated until all suitable planned cuts determined in the implant planning workflow of step 408 are completed. For example, in some embodiments the implant planning workflow of step 408 may provide for a series of cuts to be executed on the first bone using the first cutting tool (e.g., the first sagittal saw blade 516A). In such embodiments, steps 810-812 may be repeated until all planned cuts are completed.

Figure 9:
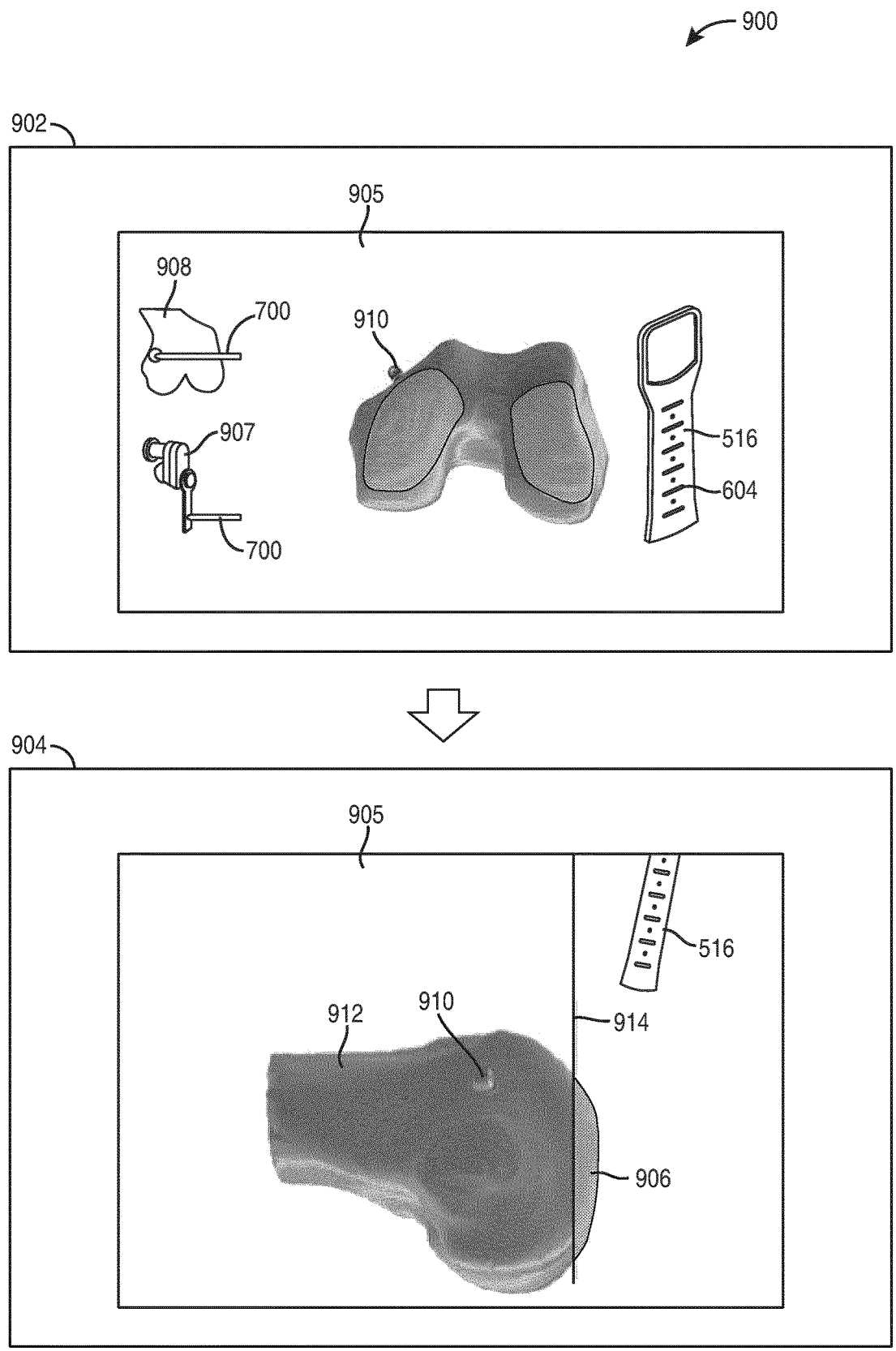
FIG. 9 is an illustration depicting an example implementation of the process of FIG. 8, according to an exemplary embodiment.

Referring now to FIG. 9, a storyboard-style illustration 900 including a first frame 902 sequentially before a second frame 904 is shown, according to an exemplary embodiment. The storyboard-style illustration 900 shows an example where process 800 is executed. The first frame 902 and second frame 904 show views in a graphical user interface 905 that can be provided via the display 264 of the surgical system 200 during a bone preparation workflow (e.g., during step 410). The graphical user interface 905 can be updated in real-time to show the position of a cutting tool (e.g., the sagittal saw blade 516), the probe 700, or the surgical device 506, and/or a planned cut relative to tracked anatomical structures (e.g., a bone). The graphical user interface 905 can also include sections of bone to be removed, shown as planned resection volume 906. The graphical user interface 905 may be used in the previously discussed processes (e.g., process 800 of FIG. 8), and the examples and processes as described below.

In the first frame 902, the graphical user interface 905 displays a first checkpoint graphic 907, which indicates (e.g., instructs) that the probe 700 should be positioned at a predefined point on a cutting tool (e.g., the sagittal saw blade 516) and/or a predefined point at a first bone. For the sake of example, the first checkpoint graphic 907 may indicate (e.g., instruct) that the probe 700 be positioned at the predefined point 604 of the sagittal saw blade 516 (e.g., the process outlined in step 806 of FIG. 8). The graphical user interface 905 may provide visual instructions to guide the user to where the probe 700 is to be positioned relative to the sagittal saw blade 516. In some embodiments, the user may indicate that the probe 700 is at the predefined point 604 of the sagittal saw blade 516 by providing a user input (e.g., pressing a foot pedal, a button on the probe 700, a button on the robotic device 500, the trigger mechanism 518 of the surgical device 506, providing a voice command, etc.). In other embodiments, the tracking system 222 and computing system 224 may automatically detect the probe 700 is at the predefined point 604 of the sagittal saw blade 516 when the probe 700 couples with the sagittal saw blade 516 at the predefined point 604. The predefined point 604 on the sagittal saw blade 516 may be a first predefined point, which may correspond with the first checkpoint. Once probe 700 is at the predefined point 604 on the sagittal saw blade 516, and the position of the probe 700 is determined by the tracking system 222, the graphical user interface 905 may indicate that the first checkpoint has been collected. This data may be collected and recorded using tracking system 222 and computing system 224.

Also in the first frame 902, the graphical user interface 905 displays a second checkpoint graphic 908, which indicates that the probe 700 must be positioned at a predefined point on the cutting tool (e.g., the sagittal saw blade 516) and/or a predefined point at the first bone. For the sake of example, the second checkpoint graphic 908 may indicate (e.g., instruct) that the probe 700 be positioned at a predefined point at the first bone (e.g., the process outlined in step 808 of FIG. 8). Like the process discussed above, the graphical user interface 905 may provide visual instructions to guide the user to where the probe 700 is to be positioned relative to the predefined point at the first bone. The predefined point at the first bone may be a second predefined point, which may correspond with the second checkpoint. The predefined point at the first bone may also be any landmark suitable for tracking (e.g., anatomical structure at the bone, and/or a pin 910, screw, divot, etc. configured to be contacted by probe 700, etc.). In some embodiments, the user may indicate that the probe 700 is at the predefined point at the first bone by providing a user input (e.g., pressing a foot pedal, a button on the probe 700, a button on the robotic device 500, the trigger mechanism 518 of the surgical device 506, providing a voice command, etc.). In other embodiments, the tracking system 222 and the computing system 224 may automatically detect the probe 700 is at the predefined point at the first bone when probe 700 couples with the predefined point at the first bone (e.g., anatomical structure, pin 910, a screw, etc.). Once the probe 700 is at the predefined point at the first bone, and the position of the probe 700 is determined by the tracking system 222, the graphical user interface may indicate that the second checkpoint has been collected. This data may be collected and recorded using tracking system 222 and computing system 224. Once the surgical system 200 (e.g., tracking system 222, computing system 224, and/or robotic device 500) has collected the first checkpoint and the second checkpoint, the surgical system 200 may select a first planned cut, and the graphical user interface 905 may display the first planned cut (e.g., the process in step 810 of FIG. 8).

In the second frame 904, the first checkpoint and the second checkpoint have been collected, and the first planned cut has been selected. The graphical user interface 905 may display the first planned cut by highlighting a planned resection volume 906 on a virtual bone model 912 of the selected bone (e.g., the first bone). The graphical user interface 905 may also display the first planned cut by illustrating a plane 914 (e.g., haptic object, virtual boundary) to which the surgical device 506 (e.g., sagittal saw blade 516) may be aligned to execute the first planned cut. In the example shown, the distal surface 102 has been selected, and the planned resection volume 906 to modify the distal surface 102 is highlighted on the virtual bone model 912 of the selected bone (e.g., the first bone) of FIG. 9. The graphical user interface 905 also shows the pose (e.g., location and orientation) of the sagittal saw blade 516 relative to the planned resection volume 906 and other anatomical features in real time. To initiate the first planned cut, the sagittal saw blade 516 may be aligned (e.g., automatically, robotically-guided) to the plane 914, for example as described above for step 308 of FIG. 3, and followed by the subsequent steps of process 300 of FIG. 3. The graphical user interface 905 may also guide the user in executing the first planned cut, as described with reference to step 812 of FIG. 8. In other implementations, e.g., for other procedures (e.g., hip arthroplasty procedures, shoulder arthroplasty procedures, spinal procedures, other orthopedic procedures, etc.) suitable user interfaces can be provided, for example showing a surgical tool suitable for the particular procedure, a planned resection volume or planned tool path for the procedure, and other elements suitable for guiding performance of the procedure.

Figure 10:
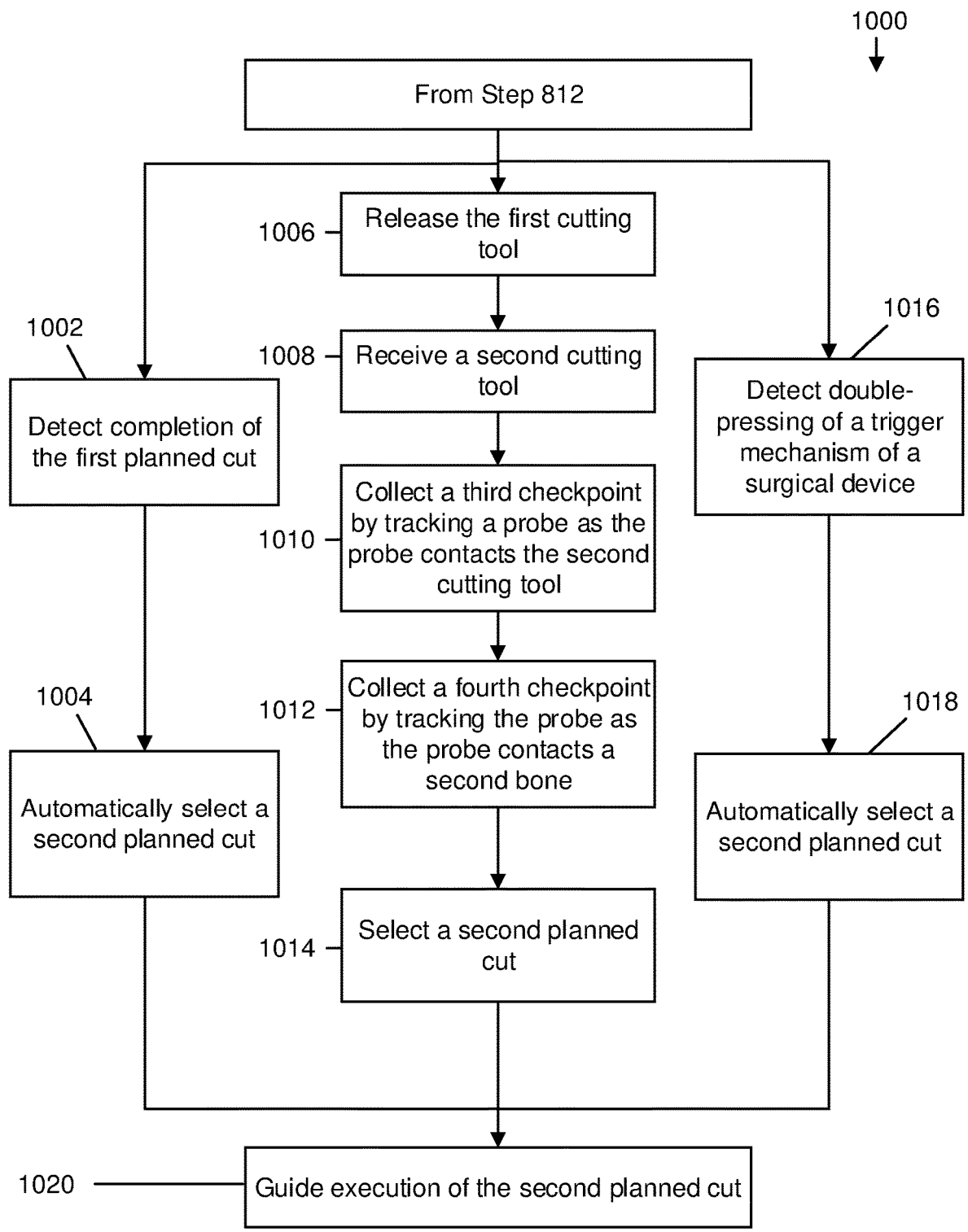
FIG. 10 is a flowchart of another example process for selecting a cut as part of the process of FIG. 4, according to an exemplary embodiment.

Referring now to FIG. 10, a flowchart of a process 1000 for executing a series of cuts is shown, according to an exemplary embodiment. The process 1000 is a possible continuation process from Step 812 of FIG. 8, and can be executed by the robotic device 500 of FIG. 5, and/or surgical system 200, for example. The process 1000 can also be implemented as part of the bone preparation workflow of step 410 of FIG. 4. The graphical user interface 905 of FIG. 9, or any other suitable graphical user interface, may be used throughout process 1000.

FIG. 10 shows that the process 1000 for executing a series of cuts can be completed in a plurality of ways. Following step 812 of FIG. 8, a determination is made as to which pathway may be used to guide execution of a second planned cut. Steps 1002-1004 represent one embodiment, steps 1006-1014 represent another embodiment, and steps 1016-1018 represent another embodiment. All pathways may result in selection of a second planned cut, and may result in the robotic device 500 guiding the second planned cut, as indicated in step 1020.

At step 1002, the surgical system 200 detects completion of the first planned cut. For example, the robotic device 500 may guide execution of the first planned cut using the first cutting tool (e.g., the first sagittal saw blade 516A), as described in step 812 of FIG. 8. A graphical user interface may be provided via the display of 264, and may be updated in real-time to show the planned resection volume 906 of the first planned cut. The surgical system 200 (e.g., tracking system 222, computing system 224, processing circuit 260, etc.) may detect completion of the first planned cut in various ways. For example, the surgical system 200 may detect completion by determining from tracking data that the first cutting tool (e.g., the first sagittal saw blade 516A) has passed through all positions needed to complete the bone resection, by determining the distance the first cutting tool (e.g., the first sagittal saw blade 516A) has traveled from the start of the first planned cut, and/or through any other suitable method of measuring the status of the first planned cut (e.g., the bone resection volume, the distance the sagittal sawblade has traveled, the surface area cut, etc.).

At step 1004, the surgical system 200 automatically selects a second planned cut. For example, once the surgical system 200 detects completion of the first planned cut, the surgical system 200 may automatically select a second planned cut. The surgical system 200 (e.g., via tracking system 222, computing system 224, and/or processing circuit 260) may select the second planned cut from the plurality of planned cuts (e.g., planned cuts in step 408 of FIG. 4). For example, the second planned cut may be selected based on a pre-determined order of cuts, for example a default order or an order set in settings for surgeon preferences. The order may vary based on which first planned cut was selected using the process 800 of FIG. 8. In some embodiments, the second planned cut is selected at least in part based on specific patient characteristics (e.g., patient information the robotic device 500, computing system 224, and/or processing circuit 260 may determine is suitable), the cutting tool (e.g., sagittal saw blade 516), and/or the bone that is intended to be cut. Similar to the first planned cut, a graphical user interface may be provided via the display of 264, and the graphical user interface may provide a three-dimensional representation of a bone model (e.g., virtual bone model) and the second planned cut.

At step 1006, the robotic device 500 releases the first cutting tool. As discussed above with regard to FIG. 8, the surgical device 506 may be, or include, any suitable cutting tool, and may be, or include, one of multiple tools interchangeably connected to the robotic device 500. For the sake of example, the robotic device 500 may release the first sagittal saw blade 516A. In this regard, the robotic device 500 may guide execution of the first planned cut using the first sagittal saw blade 516A, as described in step 812 of FIG. 8. The robotic device 500 may then release the first sagittal saw blade 516A from the surgical device 506. As discussed in reference to FIG. 6, sagittal saw blade 516 may be interchangeably connected to surgical device 506. The surgical device 506 may release the first sagittal saw blade 516A, and the power systems, computing elements, motors, and/or electronic or mechanical systems of the surgical device 506 or robotic device 500 may determine that the first sagittal saw blade 516A has been released. Such information may be relayed to the computing system 224, and displayed on a graphical user interface of display 264.

At step 1008, the robotic device 500 receives a second cutting tool. As discussed above with regard to step 1006, the surgical device 506 may be, or include, any suitable cutting tool, and may be, or include, one of multiple tools interchangeably connected to the robotic device 500. For the sake of example, after the first sagittal saw blade 516A is released, a second sagittal saw blade 516B may be selected from the plurality of cutting tools (e.g., the plurality of sagittal saw blades 516A-516E). For example, the first sagittal saw blade 516A may be released in step 1006, and the second sagittal saw blade 516B may be received in step 1008, as the primary example, although any of sagittal saw blades 516A-516E may be received and/or released in various instances of steps 1006 and 1008. The user may select the second sagittal saw blade 516B, or the surgical system 200 (e.g., robotic device 500, computing system 224, and/or processing circuit 260) may determine which second sagittal saw blade 516B is to be used, for example displaying such information to the user via a graphical user interface. In response to the surgical device 506 receiving the second sagittal saw blade 516B, the power systems, computing elements, motors, and/or other electronic or mechanical systems of the surgical device 506, or robotic device 500, may automatically operate to confirm that the second sagittal saw blade 516B has been properly received at the surgical device 506, or to detect an improper or incomplete connection between the second sagittal saw blade 516B and the surgical device 506. Such information may be relayed to the computing system 224, and displayed on a graphical user interface of display 264. For example, the display 264 may show a graphical user interface that indicates when the second sagittal saw blade 516B is not correctly received by the surgical device 506 or robotic device 500. In some embodiments, the surgical device 506 may automatically detect which of the plurality of cutting tools (e.g., the plurality of sagittal saw blades 516A-516E) has been received, for example by reading information encoded on the sagittal saw blades (e.g., RFID).

At step 1010, a third checkpoint is collected. The third checkpoint may be collected from any suitable cutting tool (e.g., the second sagittal saw blade 516B), at a bone, or at any other suitable checkpoint location, as discussed below. For the sake of example, the third checkpoint may be collected on the second sagittal saw blade 516B received in step 1008. The surgical system 200 may collect the third checkpoint by tracking the probe 700, or any other suitable tracking mechanism as discussed above, as the probe 700 contacts the second sagittal saw blade 516B at predefined point 604, similar to the process of step 806 of FIG. 8. The tracking system 222 of surgical system 200 may be used to track the probe 700 in response to user input, for example manipulation of the probe 700 at or near predefined point 604 of the second sagittal saw blade 516B. Tracking system 222 may relay tracking data to the computing system 224 of the surgical system 200. The user may indicate that the probe 700 is at the predefined point 604 of the second sagittal saw blade 516B by providing a user input (e.g., pressing a foot pedal, a button on the probe 700, a button on the robotic device 500, the trigger mechanism 518 of the surgical device 506, providing a voice command, etc.). In some embodiments, the tracking system 222 and computing system 224 may automatically detect the probe 700 is at the predefined point 604 of the second sagittal saw blade 516B when the probe 700 couples with the second sagittal saw blade 516B at the predefined point 604. The predefined point 604 on the second sagittal saw blade 516B may be a third predefined point, which may correspond with the third checkpoint. Once probe 700 is at the predefined point 604 on the second sagittal saw blade 516B, the third checkpoint may be collected via tracking system 222 and stored in computing system 224. A graphical user interface may be provided via the display 264 of the surgical system 200. The graphical user interface may be updated in real-time to show the position of probe 700 relative to the second sagittal saw blade 516B and predefined point 604. Once probe 700 is at the predefined point 604 on the second sagittal saw blade 516B, the graphical user interface may indicate that the third checkpoint has been collected. The graphical user interface may also provide instructions for positioning the probe 700 relative to predefined point 604 of the second sagittal saw blade 516B. Because the third checkpoint is specific to the second sagittal saw blade 516B, collection of the third checkpoint provides data indicative of which of the plurality of cutting tools (e.g., the plurality of sagittal saw blades) was received at step 1008, as well as, which of the plurality of planned cuts are suitable to the third checkpoint (e.g., the second sagittal saw blade 516B), as discussed below.

Step 1012 provides an optional step, which may or may not be used in combination with step 1010. For example, in some embodiments, at step 808 of FIG. 8 the second checkpoint (e.g., a checkpoint associated with the first bone) is collected by tracking the probe 700 as the probe 700 contacts the first bone. Further, at step 1010 of FIG. 10, a third checkpoint is collected on a second cutting tool (e.g., the second sagittal saw blade 516B). In some embodiments, a user may desire to complete a second planned cut (e.g., with a second cutting tool) on the same bone where the first planned cut was executed (e.g., the first bone). In such embodiments, the computing system 224 and/or processing circuit 260 of the surgical system 200 may select a second planned cut from the plurality of planned cuts based on the second checkpoint and the third checkpoint, as discussed below with regard to step 1014. In other embodiments, a user may desire to complete a second planned cut (e.g., with a second cutting tool) on a different bone than the first bone where the first planned cut was executed (e.g., on a second bone). In such embodiments, step 1012 is included.

At step 1012, a fourth checkpoint is collected, for example at a second bone of a joint. The surgical system 200 may collect a fourth checkpoint by tracking probe 700 as probe 700 contacts a second bone or a pin, screw, divot, etc. installed on the second bone, similar to the process of step 808 of FIG. 8. The tracking system 222 may be used to track probe 700 in response to user input, for example manipulation of the probe 700 near the second bone. The tracking system 222 may relay tracking data to the computing system 224. The user may indicate that the probe 700 is at a predefined point at the second bone by providing a user input (e.g., pressing a foot pedal, a button on the probe 700, a button on the robotic device 500, the trigger mechanism 518 of the surgical device 506, providing a voice command, etc.). In some embodiments, the tracking system 222 and computing system 224 may automatically detect the probe 700 is at the predefined point at the second bone when the probe 700 couples with the predefined point at the second bone (e.g., a pin, screw, etc.). The predefined point at the second bone may be a fourth predefined point at the second bone of the patient, which may correspond with the fourth checkpoint. The predefined point may also be any landmark suitable for tracking (e.g., anatomical structure at the bone, and/or a pin, screw, divot, etc. configured to be contacted by probe 700, etc.). Once the probe 700 is at the predefined point at the second bone, the fourth checkpoint may be collected via tracking system 222 and stored in the computing system 224. A graphical user interface may be provided via the display of 264, and the graphical user interface may be updated in real-time to show the position of the probe 700 relative to the predefined point at the second bone. Once probe 700 is positioned at the predefined point at the second bone, the graphical user interface may indicate that the fourth checkpoint has been collected. The graphical user interface may also provide instructions for positioning the probe 700 relative to the predefined point at the second bone. The fourth checkpoint may be indicative of which of multiple bones of the joint is being selected by the user. Collection of the fourth checkpoint may also be used to confirm and validate registration and calibration of the tracking system 222.

At step 1014, a second planned cut is selected from a plurality of planned cuts. For example, in an exemplary embodiment surgical system 200 automatically selects a second planned cut based on the first planned cut (e.g., the second checkpoint) and the third checkpoint collected via tracking system 222 and the computing system 224 (i.e., step 1012 is not used in as part of process 1000). In other embodiments, the surgical system 200 may automatically select a second planned cut based on the first planned cut (e.g., the second checkpoint), the third checkpoint, and the fourth checkpoint data collected via tracking system 222 and the computing system 224 (i.e., step 1012 is used as part of process 1000). The computing system 224 and/or processing circuit 260 of the surgical system 200 may select the second planned cut from a plurality of planned cuts determined during an implant planning workflow, for example during step 408 of FIG. 4. For example, a look-up table or rules-based algorithm that maps a combination of the first planned cut (e.g., the second checkpoint), the third checkpoint, and/or the fourth checkpoint to a planned cut, such that different combinations of cuts and checkpoints correspond to different cuts. As one example, step 1014 can include determining which of the plurality of cutting tools (e.g., the plurality of sagittal saw blades) is in use based on the third checkpoint, and/or determining which bone is selected based on the second checkpoint (and/or the fourth checkpoint), then using a stored table or set of rules to select the second planned cut based on which cut(s) are compatible with the particular cutting tool received at step 1008 (and/or the bone selected at step 1012). A suitable cut may thus be automatically selected based on the third checkpoint (and/or fourth checkpoint) collected in steps 1010 (and/or 1012). A graphical user interface may be provided via the display of 264, and the graphical user interface may provide a three-dimensional representation of a bone model (e.g., virtual bone model) and the selected, second planned cut.

At step 1016, the surgical system 200 detects the double-pressing of a trigger mechanism of a surgical device. For example, the robotic device 500 may guide execution of the first planned cut using the first cutting tool (e.g., the first sagittal saw blade 516A), as described in step 812 of FIG. 8. A graphical user interface may be provided via the display of 264, and may be updated in real-time to show the planned resection volume 906 of the first planned cut. Following completion of the first planned cut, the trigger mechanism 518 of the surgical device 506 may be double-pressed by a user. The power systems, computing elements, motors, and other electronic or mechanical systems in the housing 512 of the surgical device 506 may determine the trigger mechanism 518 of the surgical device 506 has been double-pressed, for example by detecting depression of the trigger twice within a threshold duration (e.g., twice within one second). The robotic device 500, computing system 224, and/or processing circuit 260 may also determine that the trigger mechanism 518 has been double-pressed, for example based on a signal from the trigger mechanism 518 to the computing system 224 and/or processing circuit 260 which is generated or interrupted by depression of the trigger mechanism 518.

At step 1018, the surgical system 200 automatically selects a second planned cut. For example, in response to the surgical system 200 detecting the double-pressing of the trigger mechanism 518 of the surgical device 506, the surgical system 200 may automatically select a second planned cut from the plurality of planned cuts (e.g., planned cuts in step 408 of FIG. 4). The second planned cut may be selected based on a pre-determined order of cuts, for example a default order or an order set in settings for surgeon preferences. The order may vary based on which first planned cut was selected using the process 800 of FIG. 8. In some embodiments, the second planned cut is selected at least in part based on specific patient characteristics, or other patient information the robotic device 500, computing system 224, and/or processing circuit 260 may determine is suitable. Similar to the first planned cut, a graphical user interface may be provided via the display of 264, and the graphical user interface may provide a three-dimensional representation of a bone model (e.g., virtual bone model) and the second planned cut.

At step 1020, robotic device 500 guides the second planned cut. For example, as a result of step 1004, step 1014, or step 1018, the surgical system 200 has selected the second planned cut. Robotic device 500 may control the robotic arm 504 and the surgical device 506 to situate the cutting tool (e.g., the first sagittal saw blade 516A or the second sagittal saw blade 516B) in position for the second planned cut. The robotic device 500 may control the surgical device 506 and the cutting tool (e.g., the first sagittal saw blade 516A or the second sagittal saw blade 516B) to guide the user through execution of the second planned cut. Robotic device 500 may also be configured to automatically control or move the surgical device 506 and the cutting tool (e.g., the first sagittal saw blade 516A or the second sagittal saw blade 516B) in position for, and throughout execution of, the second planned cut. A graphical user interface may also be provided via the display of 264, and the graphical user interface can be configured to guide the user in executing the second planned cut.

Following execution of step 1020, process 1000 can be repeated until all planned cuts determined in the implant planning workflow of step 408 are completed. A full bone preparation workflow (e.g., step 410) can thus be enabled by processes 800 of FIG. 8 and 1000 of FIG. 10.

Figure 11:
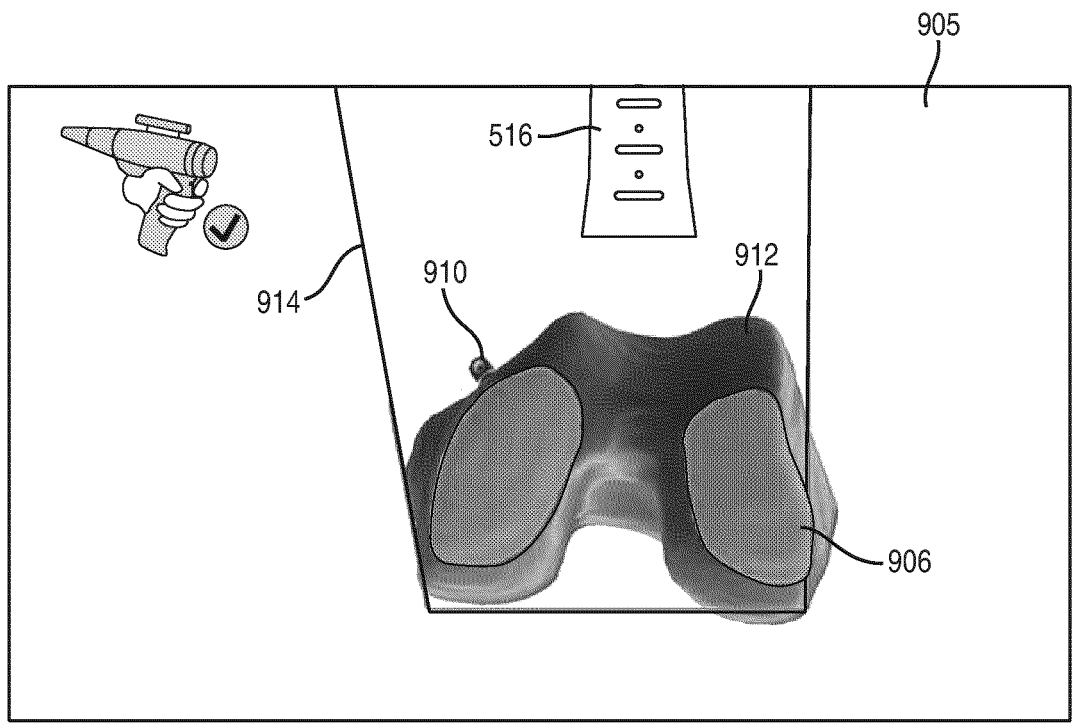
FIG. 11 is an illustration depicting an example implementation of the process of FIG. 10, according to an exemplary embodiment.

Referring now to FIG. 11, an illustration of a possible implementation of the processes of FIG. 8 and FIG. 10 are shown, according to an exemplary embodiment. The implementation shown in FIG. 11 may be executed throughout the processes of FIG. 8 and/or FIG. 10, and using the surgical system 200 with robotic device 500 described above, for example. FIG. 11 shows a view in a graphical user interface 905 that can be provided via display 264 of surgical system 200, or robotic device 500, during a bone preparation workflow (e.g., during step 410). The graphical user interface 905 can be updated in real-time to show a current pose of the surgical device 506 relative to a virtual bone model 912 of a selected bone, and can also indicate sections of bone to be removed, shown as planned resection volume 906. The graphical user interface 905 also shows the real-time location of sagittal saw blade 516 relative to planned resection volume 906 and other anatomical features. The graphical user interface 905 may guide the user in executing a first planned cut, as described in step 812 of FIG. 8, and/or a second planned cut, as described in step 1020 of FIG. 10. As a cut is performed, the planned resection volume 906 can be updated in real-time to show which portions thereof have already been resected, and which portions are still to be resected to complete the planned cut.

Figure 12:
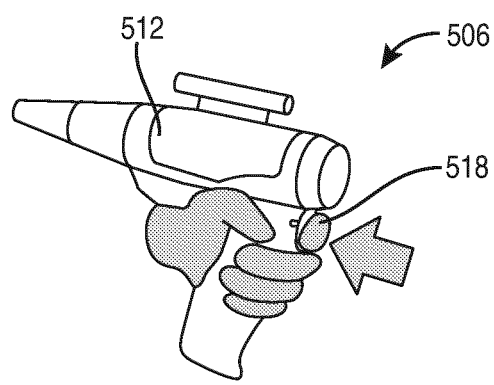
FIG. 12 is another illustration depicting an example implementation of the process of FIG. 10, according to an exemplary embodiment.

Referring now to FIG. 12, an illustration of a possible implementation of step 1016 of FIG. 10 is shown, according to an exemplary embodiment. In particular, FIG. 12 illustrates the surgical device 506 with the trigger mechanism 518 being depressed by a user. As discussed in reference to FIG. 10, following completion of the first planned cut, the trigger mechanism 518 of the surgical device 506 may be double-pressed. The surgical system 200 may determine that the trigger mechanism 518 of surgical device 506 has been double-pressed based on the power systems, computing elements, motors, and other electronic or mechanical systems in the housing 512 of surgical device 506, for example by detecting depression of the trigger twice within a threshold duration (e.g., twice within one second). The robotic device 500, computing system 224, and/or processing circuit 260 may also determine that the trigger mechanism 518 has been double-pressed, for example based on a signal from the trigger mechanism 518 to the computing system 224 and/or processing circuit 260 which is generated or interrupted by depression of the trigger mechanism 518. In response, the surgical system 200 may automatically select a second planned cut. The surgical system 200 (e.g., robotic device 500, computing system 224, and/or processing circuit 260) may not permit the trigger mechanism 518 to be double-pressed, nor a second planned cut to be selected, while the sagittal saw blade 516 is contacting a bone or completing the first planned cut.

Figure 13:
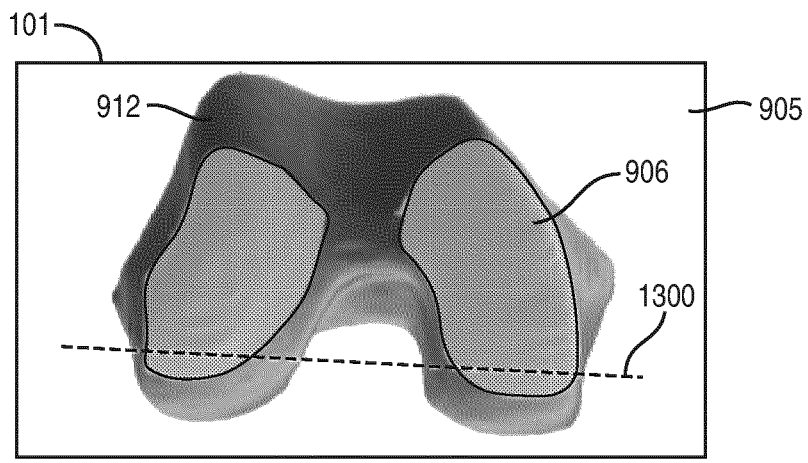
FIG. 13 is an illustration depicting an example implementation of the processes of FIGS. 8 and 10, according to an exemplary embodiment.

Referring now to FIG. 13, an illustration of a bone on a portion of a graphical user interface of FIG. 11 is shown, according to an exemplary embodiment. For the sake of example, a distal view of femur 101 is illustrated on the graphical user interface 905, as the primary example, although other bones (e.g., tibia, pelvis, etc.), joints, views (e.g., posterior, anterior, etc.), and/or cuts may be illustrated in various instances. The graphical user interface 905 may be provided via the display 264 of surgical system 200, or robotic device 500, during the bone preparation workflow (e.g., during step 410 of FIG. 4). The graphical user interface 905 may provide a distal view of the virtual bone model 912 of femur 101, and a planned resection volume 906. The graphical user interface 905 may guide the user in executing a first planned cut, as described in step 812 of FIG. 8, a second planned cut, as described in step 1020 of FIG. 10, or any combination or repetition of steps thereof. As a cut is performed, the planned resection volume 906 can be updated in real-time to show which portions thereof have already been resected, and which portions are still to be resected to complete the planned cut.

The graphical user interface 905 may also display a subsequent cut start line 1300 (e.g., an intersection between the current cut and a subsequent cut). The surgical system 200 (e.g., via robotic device 500, computing system 224, and/or processing circuit 260) may determine a virtual overlay of overlapping cuts, in which a first planned cut may be selected, and a subsequent cut start line 1300 may be determined based on a subsequent planned cut selected from the plurality of planned cuts. Bone beyond the subsequent cut start line 1300 (i.e., below from the perspective of FIG. 13) may be removed during execution of the subsequent cut. In this regard, a user may stop the first planned cut at the subsequent cut start line 1300 (i.e., the bone will be removed by starting the subsequent planned cut at the subsequent cut start line 1300). The subsequent cut start line 1300 may be provided to reduce excess resection based on the virtual overlay (e.g., stop a resection early because the volume may be resected the next cut), increase efficiency, provide the user with definitive cutting boundaries, etc. As such, the graphical user interface 905 may depict a first planned cut and a subsequent cut start line 1300 based on a virtual overlay and/or the first and second planned cuts. In an exemplary embodiment, once the first planned cut is executed, femur 101 may be modified to have a substantially planar surface, namely distal surface 102 as shown in FIG. 1. Following execution of the first planned cut, subsequent cut start line 1300 may indicate the starting point for a cut to modify femur 101 to have another substantially planar surface, namely posterior chamfer surface 104 as shown in FIG. 1.

Figure 14:
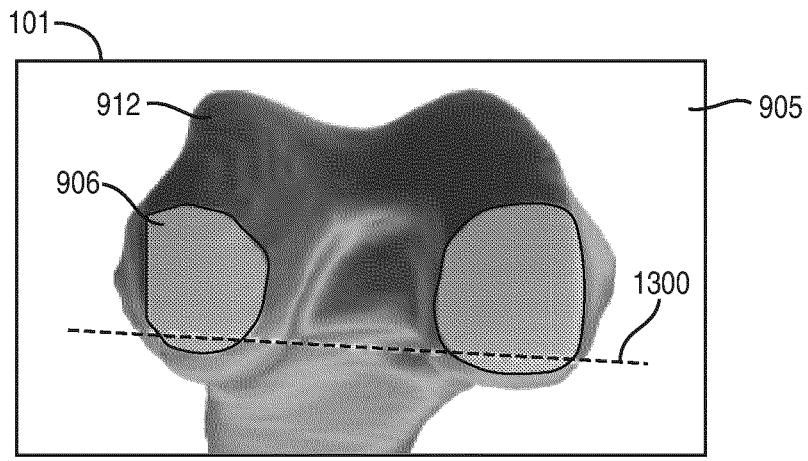
FIG. 14 is another illustration depicting an example implementation of the processes of FIGS. 8 and 10, according to an exemplary embodiment.

Referring now to FIG. 14, an illustration of a bone on a portion of a graphical user interface of FIG. 11 is shown, according to an exemplary embodiment. For the sake of example, a posterior chamfer view of femur 101 is illustrated on the graphical user interface 905, as the primary example, although other bones (e.g., tibia, hip, pelvis, etc.), joints, views (e.g., distal, anterior, etc.), and/or cuts may be illustrated in various instances. The graphical user interface 905 may be provided via the display 264 of surgical system 200, or robotic device 500, during the bone preparation workflow (e.g., during step 410 of FIG. 4). The graphical user interface 905 may provide a posterior chamfer view of the virtual bone model 912 of femur 101, and a planned resection volume 906. The graphical user interface 905 may guide the user in executing a first planned cut, as described in step 812 of FIG. 8, a second planned cut, as described in step 1020 of FIG. 10, or any combination or repetition of steps thereof. As a cut is performed, the planned resection volume 906 can be updated in real-time to show which portions thereof have already been resected, and which portions are still to be resected to complete the planned cut.

The graphical user interface 905 may also display a subsequent cut start line 1300. The surgical system 200 (e.g., via robotic device 500, computing system 224, and/or processing circuit 260) may determine a virtual overlay of overlapping cuts, in which a first planned cut may be selected, and a subsequent cut start line 1300 may be determined based on a subsequent planned cut selected from the plurality of planned cuts. The subsequent cut start line 1300 may be provided to reduce excess resection based on the virtual overlay (e.g., stop a resection early because the volume may be resected the next cut), increase efficiency, provide the user with definitive cutting boundaries, etc. As such, the graphical user interface 905 may depict a first planned cut and a subsequent cut start line 1300 based on a virtual overlay and/or the first and second planned cuts. In an exemplary embodiment, once the first planned cut is executed, femur 101 may be modified to have a substantially planar surface, namely posterior chamfer surface 104 as shown in FIG. 1. Following execution of the first planned cut, subsequent cut start line 1300 may indicate the starting point for a cut to modify femur 101 to have another substantially planar surface, namely posterior surface 106 as shown in FIG. 1.

Figure 15:
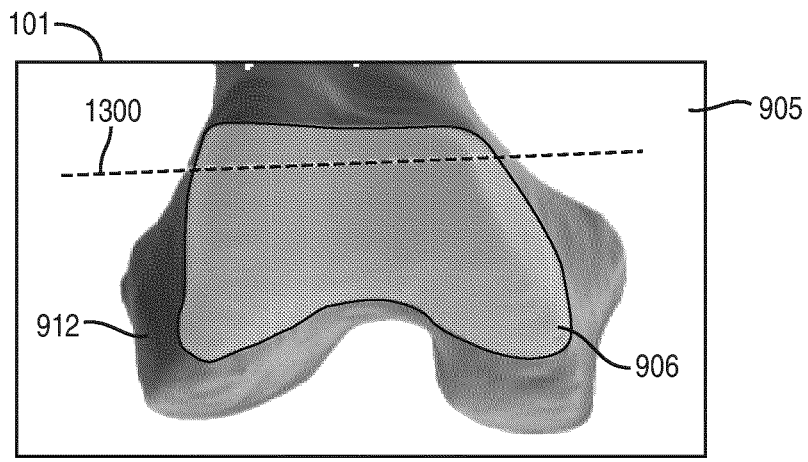
FIG. 15 is yet another illustration depicting an example implementation of the processes of FIGS. 8 and 10, according to an exemplary embodiment.

Referring now to FIG. 15, an illustration of a bone on a portion of a graphical user interface of FIG. 11 is shown, according to an exemplary embodiment. For the sake of example, a distal view of femur 101 is illustrated on the graphical user interface 905, as the primary example, although other bones (e.g., tibia, hip, pelvis, etc.), joints, views (e.g., posterior, distal, etc.), and/or cuts may be illustrated in various instances. The graphical user interface 905 may be provided via the display 264 of surgical system 200, or robotic device 500, during the bone preparation workflow (e.g., during step 410 of FIG. 4). The graphical user interface 905 may provide an anterior view of the virtual bone model 912 of femur 101, and a planned resection volume 906. The graphical user interface 905 may guide the user in executing a first planned cut, as described in step 812 of FIG. 8, a second planned cut, as described in step 1020 of FIG. 10, or any combination or repetition of steps thereof. As a cut is performed, the planned resection volume 906 can be updated in real-time to show which portions thereof have already been resected, and which portions are still to be resected to complete the planned cut.

The graphical user interface 905 may also display a subsequent cut start line 1300. The surgical system 200 (e.g., via robotic device 500, computing system 224, and/or processing circuit 260) may determine a virtual overlay of overlapping cuts, in which a first planned cut may be selected, and a subsequent cut start line 1300 may be determined based on a subsequent planned cut selected from the plurality of planned cuts. The subsequent cut start line 1300 may be provided to reduce excess resection based on the virtual overlay (e.g., stop a resection early because the volume may be resected the next cut), increase efficiency, provide the user with definitive cutting boundaries, etc. As such, the graphical user interface 905 may depict a first planned cut and a subsequent cut start line 1300 based on a virtual overlay and/or the first and second planned cuts. In an exemplary embodiment, once the first planned cut is executed, femur 101 may be modified to have a substantially planar surface, namely anterior chamfer surface 110 as shown in FIG. 1. Following execution of the first planned cut, subsequent cut start line 1300 may indicate the starting point for a cut to modify femur 101 to have another substantially planar surface, namely anterior surface 108 as shown in FIG. 1.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, magnetic, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations, for example non-transitory computer-readable media. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method of controlling a surgical system, comprising:
obtaining a surgical plan comprising a plurality of planned cuts;
receiving, at a surgical device, a first cutting tool selected from a plurality of cutting tools for use with the surgical device;
subsequent to a registration workflow that registers a first bone of a patient relative to the surgical device:
collecting a first checkpoint by tracking a probe as the probe contacts a first predefined point on the first cutting tool;
collecting a second checkpoint by tracking the probe as the probe contacts a second predefined point at the first bone of the patient;
automatically selecting a first planned cut from the plurality of planned cuts by determining that the first checkpoint and the second checkpoint correspond to the first planned cut; and
in response to the automatically selecting of the first planned cut, guiding execution of the first planned cut using the first cutting tool.

2. The method of claim 1, further comprising:
automatically detecting completion of the first planned cut; and
in response to the detecting of the completion of the first planned cut, automatically selecting a second planned cut from the plurality of planned cuts.

3. The method of claim 1, further comprising:
releasing the first cutting tool from the surgical device;
receiving, at the surgical device, a second cutting tool from the plurality of cutting tools for use with the surgical device;
collecting a third checkpoint by tracking the probe as the probe contacts a third predefined point on the second cutting tool; and
automatically selecting a second planned cut from the plurality of planned cuts based on the second checkpoint and the third checkpoint.

4. The method of claim 1, further comprising:
releasing the first cutting tool from the surgical device, wherein the first cutting tool is a first sagittal saw blade;
receiving, at the surgical device, a second sagittal saw blade from the plurality of cutting tools for use with the surgical device;
collecting a third checkpoint by tracking the probe as the probe contacts a third predefined point on the second sagittal saw blade;
collecting a fourth checkpoint by tracking the probe as the probe contacts a fourth predefined point at a second bone of the patient; and
automatically selecting a second planned cut from the plurality of planned cuts based on the first planned cut, the third checkpoint, and the fourth checkpoint.

5. The method of claim 1, further comprising automatically switching from the first planned cut to a second planned cut from the plurality of planned cuts in response to detecting double-pressing of a trigger mechanism of the surgical device.

6. The method of claim 1, further comprising providing a graphical user interface comprising:
a representation of the first planned cut; and
an indication of a position of a second planned cut of the plurality of planned cuts relative to the first planned cut.

7. The method of claim 1, wherein the determining that the first checkpoint and the second checkpoint correspond to the first planned cut comprises using stored associations between the plurality of planned cuts and different checkpoint combinations comprising different first checkpoints associated with different tools of the plurality of cutting tools and different second checkpoints associated with different bones.

8. The method of claim 1, wherein the determining that the first checkpoint and the second checkpoint correspond to the first planned cut comprises mapping, using a stored table, the first checkpoint and the second checkpoint to the first planned cut from the plurality of planned cuts.

9. The method of claim 1, wherein the first checkpoint is specific to the first cutting tool, and wherein the method comprises identifying which of the plurality of cutting tools is in use as the first cutting tool using the first checkpoint.

10. The method of claim 9, wherein the determining that the first checkpoint and the second checkpoint correspond to the first planned cut comprises determining that the first planned cut of the first bone is compatible with the first cutting tool.

11. The method of claim 1, wherein the method comprises identifying, using the second checkpoint, which of a plurality of bones of a joint is the first bone.

12. A surgical system, comprising:
a surgical device;
a first cutting tool selected from a plurality of cutting tools interchangeably attachable to the surgical device;
a probe;
a tracking system configured to collect tracking data indicating positions of the probe; and
circuitry configured to:
receive the tracking data;
determine which of the plurality of cutting tools is selected as the first cutting tool using, from the tracking data, a first position of the probe relative to a connection end of the first cutting tool when the probe contacts a first predefined point on the first cutting tool;
automatically select a first planned cut from a plurality of planned cuts based on which of the plurality of cutting tools is the first cutting tool and using stored associations between the plurality of cutting tools and the plurality of planned cuts; and
guide execution of the first planned cut using the surgical device and the first cutting tool.

13. The surgical system of claim 12, wherein the circuitry is further configured to:
automatically detect completion of the first planned cut; and
in response to the detecting of the completion of the first planned cut, automatically select a second planned cut from the plurality of planned cuts.

14. The surgical system of claim 12, wherein the circuitry is further configured to:
determine a second checkpoint based on a second position of the probe as the probe contacts a second predefined point at a first bone of a patient;
determine a third checkpoint based on a third position of the probe as the probe contacts a third predefined point on a second cutting tool of the plurality of cutting tools; and
select a second planned cut from the plurality of planned cuts based on the second checkpoint and the third checkpoint.

15. The surgical system of claim 12, wherein the surgical device is configured to:
release the first cutting tool, wherein the first cutting tool is a first sagittal saw blade; and
receive a second sagittal saw blade from the plurality of cutting tools.

16. The surgical system of claim 15, wherein the circuitry is further configured to:
determine a second checkpoint based on a second position of the probe as the probe contacts a second predefined point at a first bone of a patient;
determine a third checkpoint based on a third position of the probe as the probe contacts a third predefined point on the second sagittal saw blade;
determine a fourth checkpoint based on a fourth position of the probe as the probe contacts a fourth predefined point at a second bone of the patient; and
select a second planned cut from the plurality of planned cuts based on the first planned cut, the third checkpoint, and the fourth checkpoint.

17. The surgical system of claim 12, wherein the surgical device comprises a trigger mechanism, and is configured to automatically switch from the first planned cut to a second planned cut from the plurality of planned cuts in response to the trigger mechanism being double-pressed.

18. The surgical system of claim 12, further comprising a graphical user interface configured to:
   display a representation of the first planned cut; and
   display an indication of a position of a second planned cut from the plurality of planned cuts relative to the first planned cut.

\* \* \* \* \*